United States Patent
Kazlas et al.

(10) Patent No.: US 12,539,673 B2
(45) Date of Patent: Feb. 3, 2026

(54) VOLUMETRIC THREE-DIMENSIONAL PRINTING METHODS

(71) Applicant: QUADRATIC 3D, INC., Charlestown, MA (US)

(72) Inventors: Peter T. Kazlas, Sudbury, MA (US); Karen Twietmeyer, Belmont, MA (US); Joshua C. Born, Cambridge, MA (US)

(73) Assignee: QUADRATIC 3D, INC., Charlestown, MA (US)

( * ) Notice: Subject to any disclaimer, the term of this patent is extended or adjusted under 35 U.S.C. 154(b) by 207 days.

(21) Appl. No.: 18/216,951

(22) Filed: Jun. 30, 2023

(65) Prior Publication Data

US 2023/0339187 A1    Oct. 26, 2023

Related U.S. Application Data

(63) Continuation of application No. PCT/US2022/011146, filed on Jan. 4, 2022.
(Continued)

(51) Int. Cl.
*B29C 64/386* (2017.01)
*B29C 64/124* (2017.01)
(Continued)

(52) U.S. Cl.
CPC .......... *B29C 64/386* (2017.08); *B29C 64/124* (2017.08); *B33Y 10/00* (2014.12); *B33Y 50/00* (2014.12)

(58) Field of Classification Search
CPC .... B29C 64/124; B29C 64/129; B29C 64/135
See application file for complete search history.

(56) References Cited

U.S. PATENT DOCUMENTS

| | | | |
|---|---|---|---|
| 5,496,682 | A | 3/1996 | Quadir et al. |
| 6,291,110 | B1 | 9/2001 | Cooper et al. |

(Continued)

FOREIGN PATENT DOCUMENTS

| | | |
|---|---|---|
| CN | 105690754 A | 6/2016 |
| WO | WO2015/059179 A1 | 4/2015 |

(Continued)

OTHER PUBLICATIONS

Beauti, Sumar, Abstract entitled "Search for New Chromophore Pairs for Triplet-Triplet Annihilation Upconversion" ISEF Projects Database, Finalist Abstract (2017), available at https://abstracts.societyforscience.org.
(Continued)

*Primary Examiner* — Xiao S Zhao
*Assistant Examiner* — Nicholas J Chidiac

(57) ABSTRACT

A method for printing a three-dimensional object in a volume of a photopolymerizable liquid by photopolymerization, the method comprising: (a) providing a digital representation of a three-dimensional object that has been sliced into a plurality of sequential two-dimensional image slices along the z-direction; (b) processing each of the two-dimensional slices of the three-dimensional object into a sequence of subsampled images, each subsampled image comprising an arrangement of pixels wherein each pixel has defined x and y dimensions; (c) sequentially exposing each of the sequence of subsampled images of a slice at a selected location along the z-direction in the volume using excitation light until the volume at the selected location along the z-direction has been exposed to all of the subsampled images of the slice, and (d) sequentially repeating step (c) for a previously unexposed sequential slice of the three-dimensional object, each at different selected location along the z-direction, until the three-dimensional object is formed.

(Continued)

A pixel can comprise a single pixel or a grouping of pixels. Preferably the pixels in a grouping of pixels are adjacent pixels. Preferably, the pixels of a subsampled image are separated from each other by a distance. Other methods are further disclosed.

24 Claims, 13 Drawing Sheets

Related U.S. Application Data

(60) Provisional application No. 63/134,178, filed on Jan. 5, 2021.

(51) Int. Cl.
  B33Y 10/00 (2015.01)
  B33Y 50/00 (2015.01)

(56) References Cited

U.S. PATENT DOCUMENTS

| | | | |
|---|---|---|---|
| 9,415,544 B2* | 8/2016 | Kerekes | B33Y 50/02 |
| 10,156,793 B2 | 12/2018 | Hou | |
| 10,569,472 B2 | 2/2020 | Zhang | |
| 10,659,656 B2 | 5/2020 | Morovic et al. | |
| 10,773,510 B2 | 9/2020 | Wynne et al. | |
| 10,780,640 B2* | 9/2020 | Wynne | B29C 64/129 |
| 10,906,246 B2* | 2/2021 | Tomioka | B29C 64/129 |
| 11,097,531 B2* | 8/2021 | Abell | B33Y 70/00 |
| 12,083,744 B2* | 9/2024 | Dudley | B29C 64/124 |
| 12,138,852 B2* | 11/2024 | Abell | B32B 1/00 |
| 12,157,275 B2* | 12/2024 | Moran | B29C 64/124 |
| 2005/0208168 A1 | 9/2005 | Hickerson et al. | |
| 2006/0171582 A1 | 8/2006 | Eichhorn | |
| 2008/0054531 A1* | 3/2008 | Kerekes | B29C 64/393 |
| | | | 425/174 |
| 2010/0249979 A1 | 9/2010 | John et al. | |
| 2013/0142413 A1 | 6/2013 | So et al. | |
| 2016/0067922 A1 | 3/2016 | Voris et al. | |
| 2016/0303797 A1 | 10/2016 | Moran | |
| 2016/0332368 A1* | 11/2016 | Kerekes | B29C 64/393 |
| 2017/0100885 A1 | 4/2017 | DeSimone et al. | |
| 2017/0102679 A1 | 4/2017 | Greene et al. | |
| 2018/0009162 A1 | 1/2018 | Moore | |
| 2018/0370123 A1* | 12/2018 | Abell | B29C 64/321 |
| 2019/0210285 A1* | 7/2019 | Tomioka | B29C 64/264 |
| 2019/0250391 A1 | 8/2019 | Gao | |
| 2020/0031051 A1* | 1/2020 | Wynne | B33Y 50/02 |
| 2020/0353684 A1* | 11/2020 | Dudley | B33Y 10/00 |
| 2020/0361152 A1 | 11/2020 | Shusteff et al. | |
| 2021/0379831 A1* | 12/2021 | Abell | B29C 64/321 |
| 2021/0394449 A1* | 12/2021 | Kostenko | G06T 7/62 |
| 2022/0063196 A1* | 3/2022 | Steege | B29C 64/264 |
| 2022/0339883 A1* | 10/2022 | Moran | B29C 64/282 |
| 2024/0051233 A1 | 2/2024 | Baldeck et al. | |
| 2024/0308131 A1* | 9/2024 | Weidman | B29C 64/236 |

FOREIGN PATENT DOCUMENTS

| | | |
|---|---|---|
| WO | WO2019/025717 A1 | 2/2019 |
| WO | WO2020/113018 A1 | 6/2020 |
| WO | WO2020/257231 A1 | 12/2020 |
| WO | WO 2021/067577 A1 | 4/2021 |
| WO | WO 2021/154895 A1 | 8/2021 |
| WO | WO 2021/154897 A1 | 8/2021 |
| WO | WO 2021/202524 A1 | 10/2021 |
| WO | WO 2021/247926 A1 | 12/2021 |
| WO | WO 2021/247930 A1 | 12/2021 |
| WO | WO 2022/171704 A1 | 8/2022 |

OTHER PUBLICATIONS

Campbell, Thomas, et al., "Could 3D Printing Change the World? Technologies, Potential, and Implications of Additive Manufacturing", Atlantic Council, Washington, D.C. 3 (2011) Oct. 2011 (Oct. 2011) Retrieved Mar. 4, 2022 (Mar. 4, 2022) from https://atlanticcouncil.org/wp-content/uploads/2011/10/2017_ACUS_3DPrinting.PDF.

Haruki, Rena, et al., Chem. Commun., 2020, Advance Article accepted May 13, 2020 and published May 13, 2020.

International Search Report, Written Opinion, and PCT Search History mailed Apr. 6, 2022 in International Application No. PCT/US2022/011146 of Quadratic 3D, Inc. filed Jan. 4, 2022 (parent of the present application).

Lee, Yi-Hsiung, et al., "Fabrication of Periodic 3D Nanostructuration for Optical Surfaces by Holographic Two-Photon-Polymerization", Int'l Journal of Information and Electronics Engineering, vol. 6, No. 3, May 2016.

Sanders, Samuel N., et al., "Photon Upconversion in Aqueous Nanodroplets", J. Amer. Chem. Soc. 2019, 141, 9180-9184.

Texas Instruments Application Report DLPA022-Jul. 2010 entitled "DLP™ System Optics" Jul. 2010.

Texas Instruments "TI DL® Technology for 3D Printing—Design scalable high-speed stereolithography [sic] systems using TI DLP technology" 2016.

Texas Instruments "DLP6500 0.65 1018p MVSP Type A DMD", DLP6500, DLPS040A-Oct. 2014—Revised Oct. 2016.

* cited by examiner

FIG. 7A
FIG. 7B
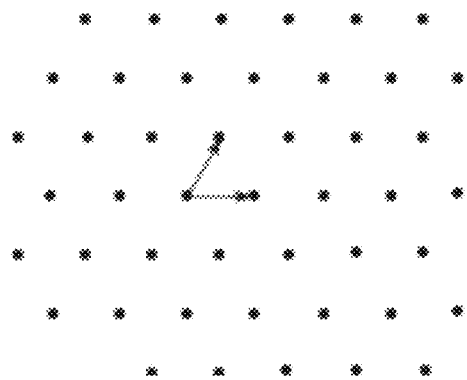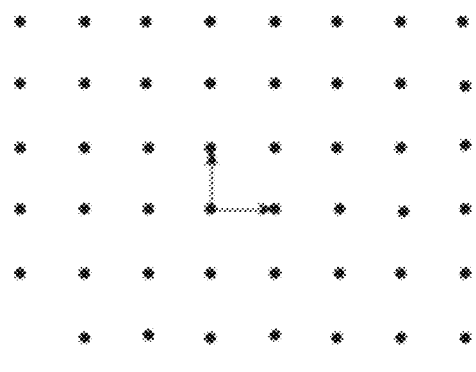
FIG. 8A
FIG. 8B
FIG. 8C
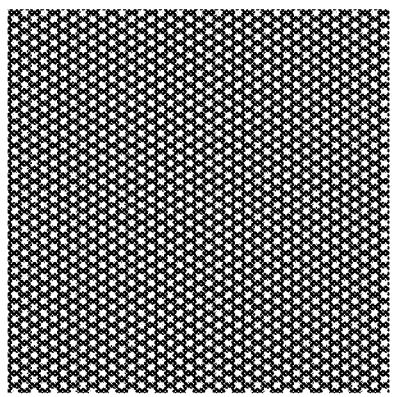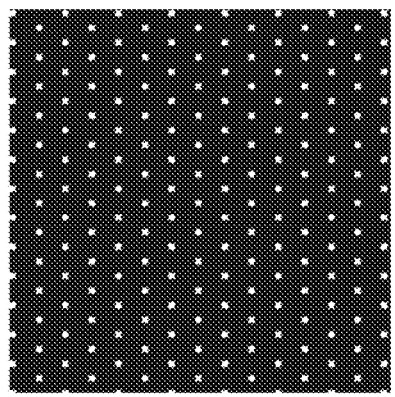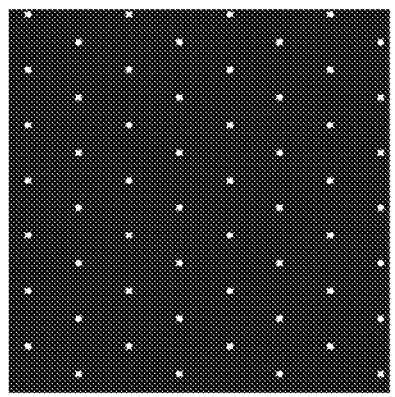
FIG. 9A  FIG. 9B  FIG. 9C  FIG. 9D
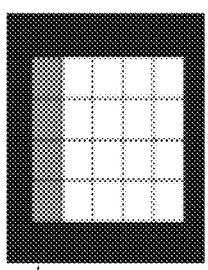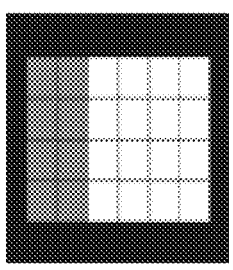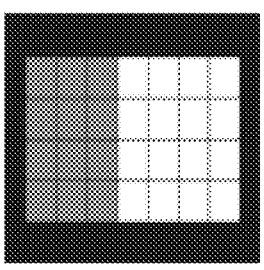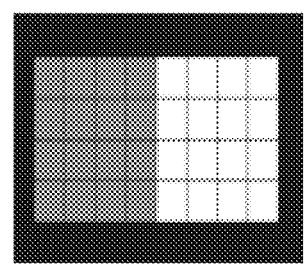
901  902  903  904

FIG. 12A  FIG. 12B
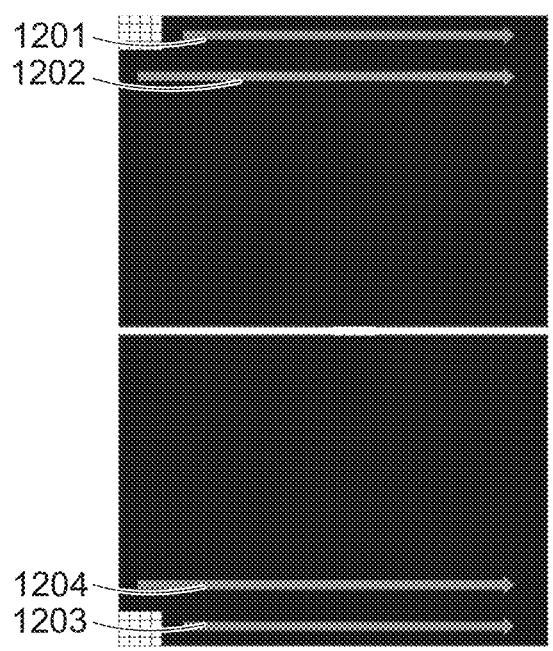
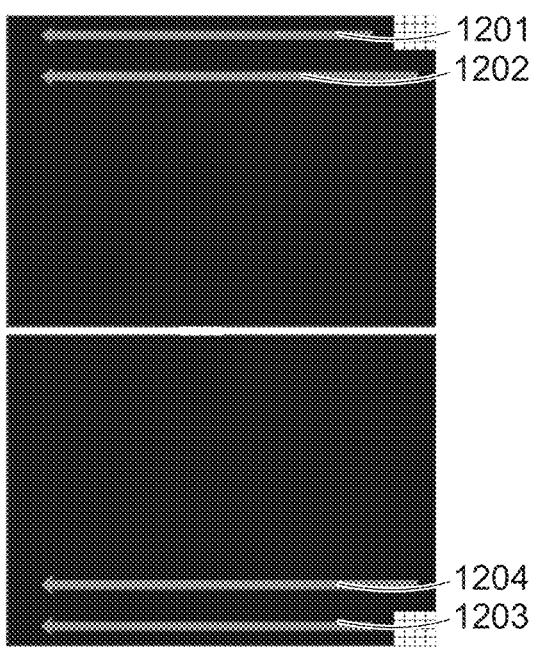
FIG. 12C  FIG. 12D

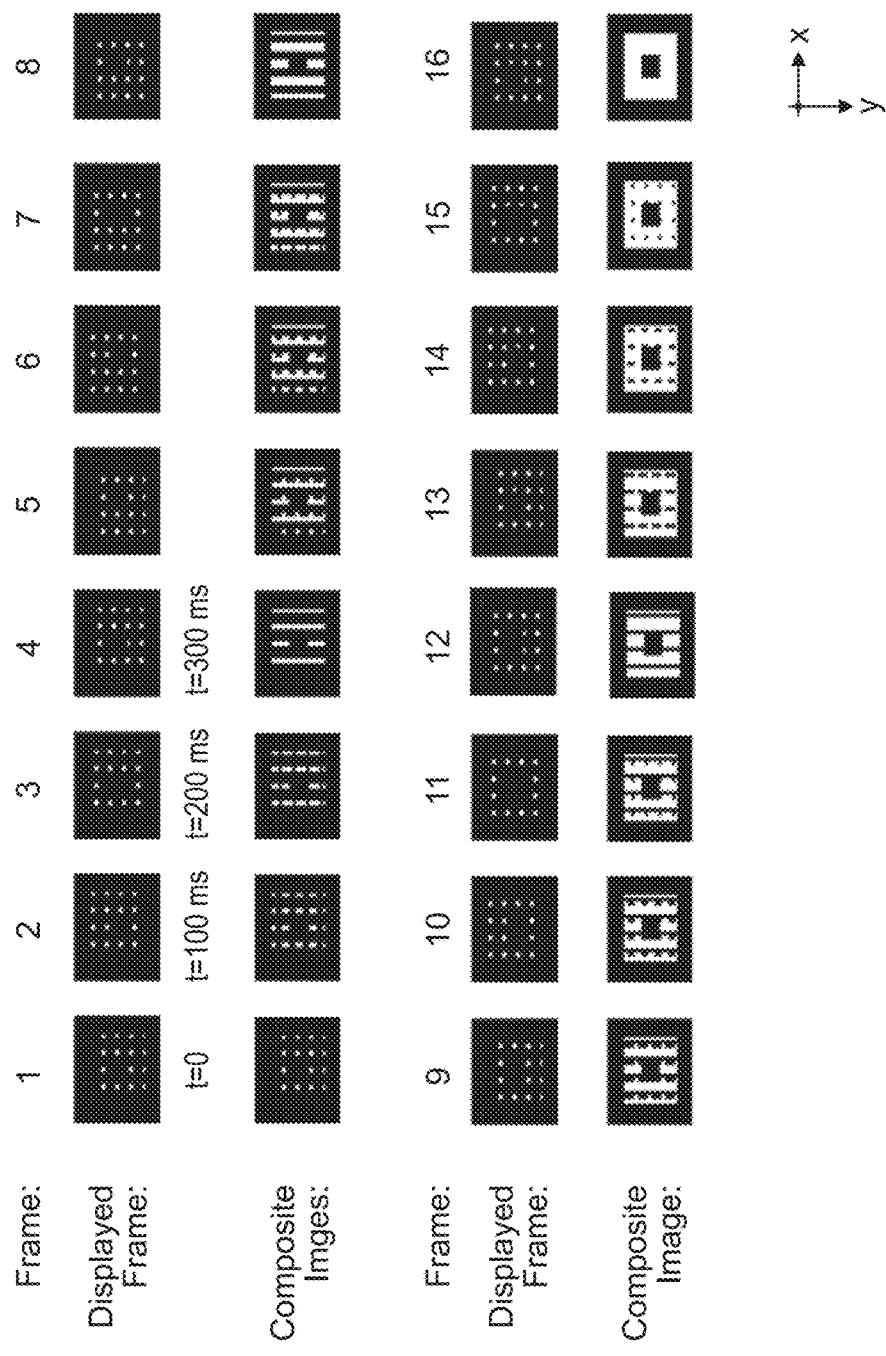
FIG. 15B

VOLUMETRIC THREE-DIMENSIONAL PRINTING METHODS

CROSS-REFERENCE TO RELATED APPLICATIONS

This application is a continuation of International Application No. PCT/US2022/011146 filed Jan. 4, 2022, which International Application claims priority to U.S. Provisional Patent Application No. 63/134,178, filed on Jan. 5, 2021, which applications are hereby incorporated herein by reference in their entireties for all purposes.

TECHNICAL FIELD OF THE INVENTION

The present invention relates to the technical field of three-dimensional printing.

BRIEF SUMMARY OF THE INVENTION

In accordance with one aspect of the present invention, there is provided a method for printing a three-dimensional object in a volume of a photopolymerizable liquid by photopolymerization, the method comprising:
  (a) providing a digital representation of a three-dimensional object that has been sliced into a plurality of sequential two-dimensional image slices along the z-direction;
  (b) processing each of the two-dimensional slices of the three-dimensional object into a sequence of subsampled images, each subsampled image comprising an arrangement of pixels;
  (c) sequentially exposing each of the sequence of subsampled images of a slice at a selected location along the z-direction in the volume using excitation light until the volume at the selected location along the z-direction has been exposed to all of the subsampled images of the slice,
  (d) sequentially repeating step (c) for a previously unexposed sequential slice of the three-dimensional object, each at different selected location along the z-direction, until the three-dimensional object is formed.

A pixel can comprise a single pixel or a grouping of pixels. Preferably the pixels in a grouping of pixels are adjacent pixels.

In accordance with another aspect of the present invention, there is provided a method for printing a three-dimensional object in a volume of photopolymerizable liquid by photopolymerization, the method comprising:
  (a) providing a digital representation of a three-dimensional object that has been sliced into a plurality of sequential two-dimensional image slices along the z-direction;
  (b) processing a two-dimensional slice of the three-dimensional object into a sequence of subsampled images, each subsampled image comprising an arrangement of pixels;
  (c) sequentially exposing each of the subsampled images of the slice at a selected location along the z-direction in the volume using excitation light until the volume at the selected location along the z-direction has been exposed to all of the subsampled images of the slice,
  (d) sequentially repeating steps (b) and (c) for a previously unexposed sequential slice of the three-dimensional object, each at different selected location along the z-direction, until the three-dimensional object is formed.

A pixel can comprise a single pixel or a grouping of pixels. Preferably the pixels in a grouping of pixels are adjacent pixels.

In accordance with a further aspect of the present invention, there is provided a method for printing a three-dimensional object in a volume of a photopolymerizable liquid by photopolymerization, the method comprising:
  (a) providing a digital representation of a three-dimensional object that has been sliced into a plurality of sequential two-dimensional image slices along the z-direction;
  (b) applying a sampling grid mask to a slice of the two-dimensional object to create a subsampling image of the slice, the subsampling image comprising an arrangement of pixels wherein each pixel has defined x and y dimensions, the sampling grid mask including an arrangement of pixel apertures on a grid, each pixel aperture having defined x and y dimensions for permitting passage of excitation light;
  (c) exposing the subsampled image at a selected location along the z-direction in the volume using excitation light to expose the volume at the selected location to an active subsampled image of the slice,
  (d) reapplying the sampling grid mask to the slice with a positional offset to create a next subsampled image different from a previously exposed subsampled image of the slice and exposing the next subsampled image at the selected location along the z-direction in the volume using excitation light to expose the volume at the selected location to the next subsampled image of the slice;
  (e) repeating step (d) until the volume at the selected location along the z-direction has been exposed to all of the subsampled images of the slice; and
  (f) repeating steps (b), (c) and (d) for a previously unexposed sequential slice, each at different selected location along the z-direction, until the three-dimensional object is formed.

A pixel can comprise a single pixel or a grouping of pixels. Preferably the pixels in a grouping of pixels are adjacent pixels.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

It is to be understood that both the foregoing general description and the following detailed description are exemplary and explanatory only and are not restrictive of the invention as claimed.

The foregoing, and other aspects and embodiments described herein and contemplated by this disclosure all constitute embodiments of the present invention.

Other embodiments will be apparent to those skilled in the art from consideration of the description and drawings, from the claims, and from practice of the invention disclosed herein.

BRIEF DESCRIPTION OF THE DRAWINGS

In the drawings,

FIGS. 7A and 7B respectively depict diagrams of examples of a hexagonal lattice and a square lattice.

FIGS. 8A, 8B, and 8C depict diagrams of examples of a 4×4 superpixel with different grid spacings. FIG. 8A depicts a diagram of an example of a 4×4 superpixel with 8 pixel spacing; FIG. 8B depicts a diagram of an example of a 4×4 superpixel with 20 pixel spacing; and FIG. 8C depicts a diagram of an example of a 4×4 superpixel with 40 pixel spacing.

FIGS. 9A-9D depict diagrams of examples of a superpixel of size 4×4 pixels with different offset values. The shaded pixels represent pixels that were "on" in the first exposure and were turned off for the second exposure. The white pixels represent pixels that are "on" in the second exposure. The examples show offsets that vary from 1 to 4 pixels.

FIG. 10A depicts a representation of an example of a hexagonal lattice with the grid split into a square pattern and FIG. 10B depicts a representation of an example of a hexagonal lattice with the grid split into a rectangular pattern. The superpixel (shown in white) has dimensions of 4×4 pixels.

FIGS. 12A-12D depict diagrams four examples of various directions in which a pixel (e.g., a superpixel) can be projected or moved during projection into a volume of a photopolymerizable liquid.

FIGS. 15A and 15B illustrate an example of a method in accordance with one or more aspects of the present invention.

FIG. 15A depicts two frames of the algorithm where a target slice image is multiplied or logically AND-ed with a sampling grid or mask resulting in a subsampled DMD image which is projected into the resin. In this example, the original slice image is 50×50 pixels in dimension. The largest spatial extent of active pixels in the slice image is 30 pixels wide. The sampling grid consists of superpixels that are 2×2 pixels in size on a sampling grid of 8×8 pixels. After multiplication the resulting subsampled DMD image has active pixel areas that have a limited spatial extent of no more than 2×2 pixels.

FIG. 15B depicts a non-limiting example of a sequence of sixteen frames of subsampled images of the target slice image and the resulting composite images after each frame. (Sequences including lower or higher numbers of frames can be used.) Each displayed frame has active pixel areas that have a limited spatial extent of no more than 2×2 pixels. After sixteen frame the composite image equals the desired target slice image. (Orientation directions for the drawing are also shown; the z direction (not shown) is perpendicular to the depicted images.)

Figure 1:
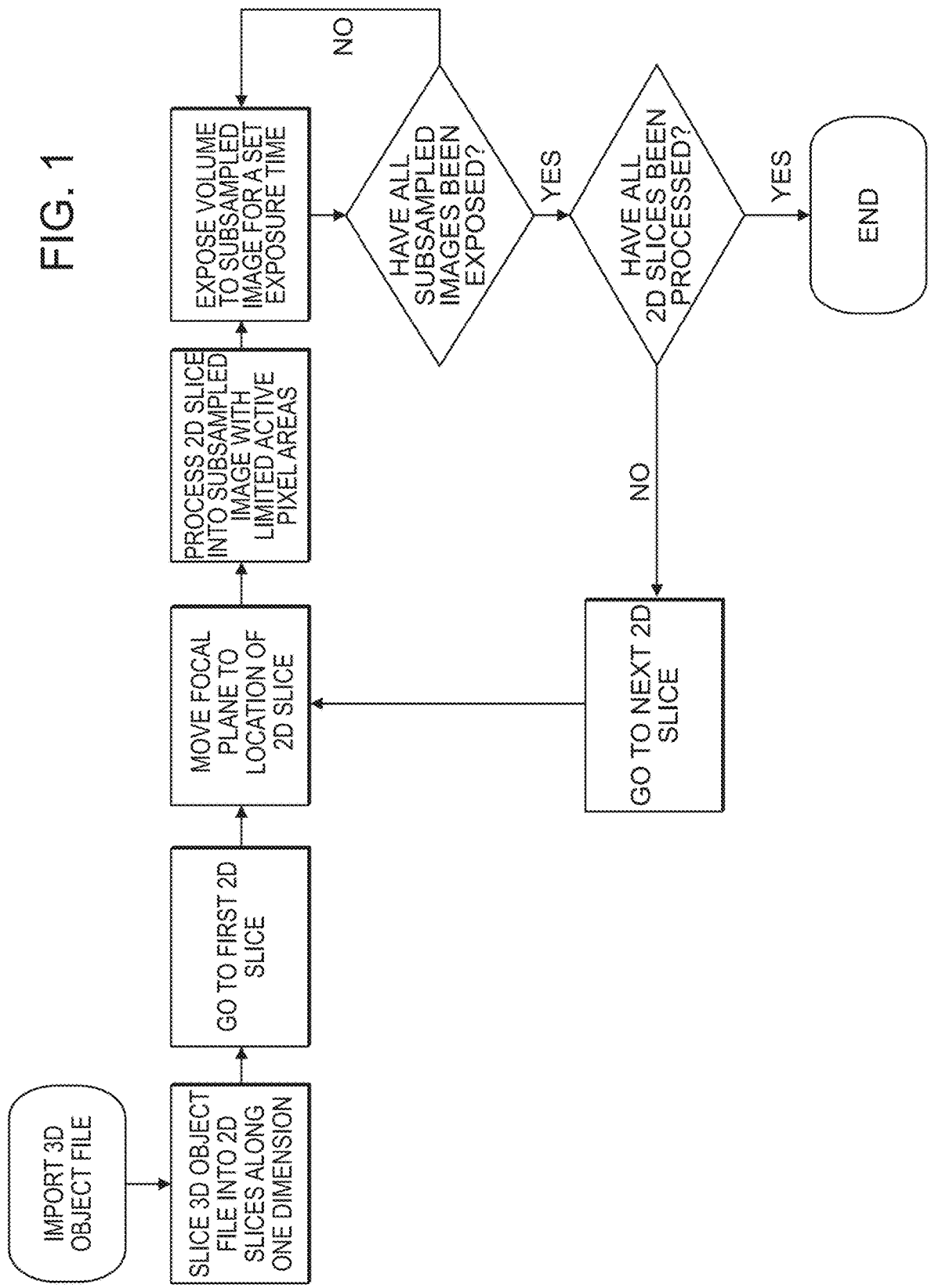
FIG. 1 is a flow chart for an example of a method in accordance with an aspect of the invention.

The attached figures are simplified representations presented for purposes of illustration only; the actual structures may differ in numerous respects, particularly including the relative scale of the articles depicted and aspects thereof.

For a better understanding to the present invention, together with other advantages and capabilities thereof, reference is made to the following disclosure and appended claims in connection with the above-described drawings.

DETAILED DESCRIPTION OF THE INVENTION

Various aspects and embodiments of the present inventions will be further described in the following detailed description.

The present invention relates to methods and systems for volumetric printing a three-dimensional object.

In accordance with one aspect of the present invention, there is provided a method for printing a three-dimensional object in a volume of a photopolymerizable liquid by photopolymerization, the method comprising:

(a) providing a digital representation of a three-dimensional object that has been sliced into a plurality of sequential two-dimensional image slices along the z-direction;

(b) processing each of the two-dimensional slices of the three-dimensional object into a sequence of subsampled images, each subsampled image comprising an arrangement of pixels;

(c) sequentially exposing each of the sequence of subsampled images of a slice at a selected location along the z-direction in the volume using excitation light until the volume at the selected location along the z-direction has been exposed to all of the subsampled images of the slice, (d) sequentially repeating step (c) for a previously unexposed sequential slice of the three-dimensional object, each at different selected location along the z-direction, until the three-dimensional object is formed.

Preferably, the pixels of a subsampled image are separated from each other by a distance. More preferably, the pixels of the subsampled image are separated from each other by at least a distance to prevent optical communication between them.

Optionally, the method further includes slicing a digital three-dimensional object file.

In accordance with another aspect of the present invention, there is provided a method for printing a three-dimensional object in a volume of photopolymerizable liquid by photopolymerization, the method comprising:

(a) providing a digital representation of a three-dimensional object that has been sliced into a plurality of sequential two-dimensional image slices along the z-direction;

(b) processing a two-dimensional slice of the three-dimensional object into a sequence of subsampled images, each subsampled image comprising an arrangement of pixels;

(c) sequentially exposing each of the subsampled images of the slice at a selected location along the z-direction in the volume using excitation light until the volume at the selected location along the z-direction has been exposed to all of the subsampled images of the slice, (d) sequentially repeating steps (b) and (c) for a previously unexposed sequential slice of the three-dimensional object, each at different selected location along the z-direction, until the three-dimensional object is formed.

Preferably, the pixels of a subsampled image are separated from each other by a distance. More preferably, the pixels of the subsampled image are separated from each other by at least a distance to prevent optical communication between them.

Optionally, the method further includes slicing a digital three-dimensional object file.

A flow chart for an example of a method in accordance with this aspect of the invention that further includes a slicing step is shown in FIG. 1. The example of the method outlined in FIG. 1 includes: importing a file for the 3D object to be printed; slicing the 3D object file into two-dimensional (2D) slices along one dimension (e.g., the z-dimension); selecting the first 2D slice, moving the focal plane to the location of the 2D slice and processing the 2D slice into a sequence of subsampled images with each having a distinct complementary limited active pixel area (e.g., less than all the pixel areas are active); exposing the selected location in the volume to a subsampled image for a selected exposure time; if not all of the sequential subsampled images for the given slice have been exposed, exposing the selected location in the volume to the remaining subsampled images until all of the subsampled images of the given slice have been exposed; if not all of the 2D slices have been processed, go to the next 2D slice, move the focal plane to the location of the next 2D slice, process the 2D slice into a sequence of subsampled images, as described above, and expose the volume at a selected location in the volume for printing the next 2D slice, and repeating at the same or different selected locations in the volume until all 2D slices of the 3d object to be printed have been processed.

Optionally, each of the 2D slices can be processed into a sequence of subimages before exposure of the subimages for the 2D slice is initiated.

In accordance with a further aspect of the present invention, there is provided a method for printing a three-dimensional object in a volume of a photopolymerizable liquid by photopolymerization, the method comprising:

(a) providing a digital representation of a three-dimensional object that has been sliced into a plurality of sequential two-dimensional image slices along the z-direction;

(b) applying a sampling grid mask to a slice of the two-dimensional object to create a subsampling image of the slice, the subsampling image comprising an arrangement of pixels wherein each pixel has defined x and y dimensions, the sampling mask including an arrangement of pixel apertures on a grid, each pixel aperture having defined x and y dimensions for permitting passage of excitation light;

(c) exposing the subsampled image at a selected location along the z-direction in the volume using excitation light to expose the volume at the selected location to an active subsampled image of the slice, (d) reapplying the subsampling mask to the slice with a positional offset to create a next subsampled image different from a previously exposed subsampled image of the slice and exposing the next subsampled image at the selected location along the z-direction in the volume using excitation light to expose the volume at the selected location to the next subsampled image of the slice;

(e) repeating step (d) until the volume at the selected location along the z-direction has been exposed to all of the subsampled images of the slice; and (f) repeating steps (b), (c) and (d) for a previously unexposed sequential slice, each at different selected location along the z-direction, until the three-dimensional object is formed.

Preferably, the pixels of a subsampled image are separated from each other by a distance. More preferably, the pixels of the subsampled image are separated from each other by at least a distance to prevent optical communication between them.

Optionally, the method further includes slicing a digital three-dimensional object file.

Figure 2:
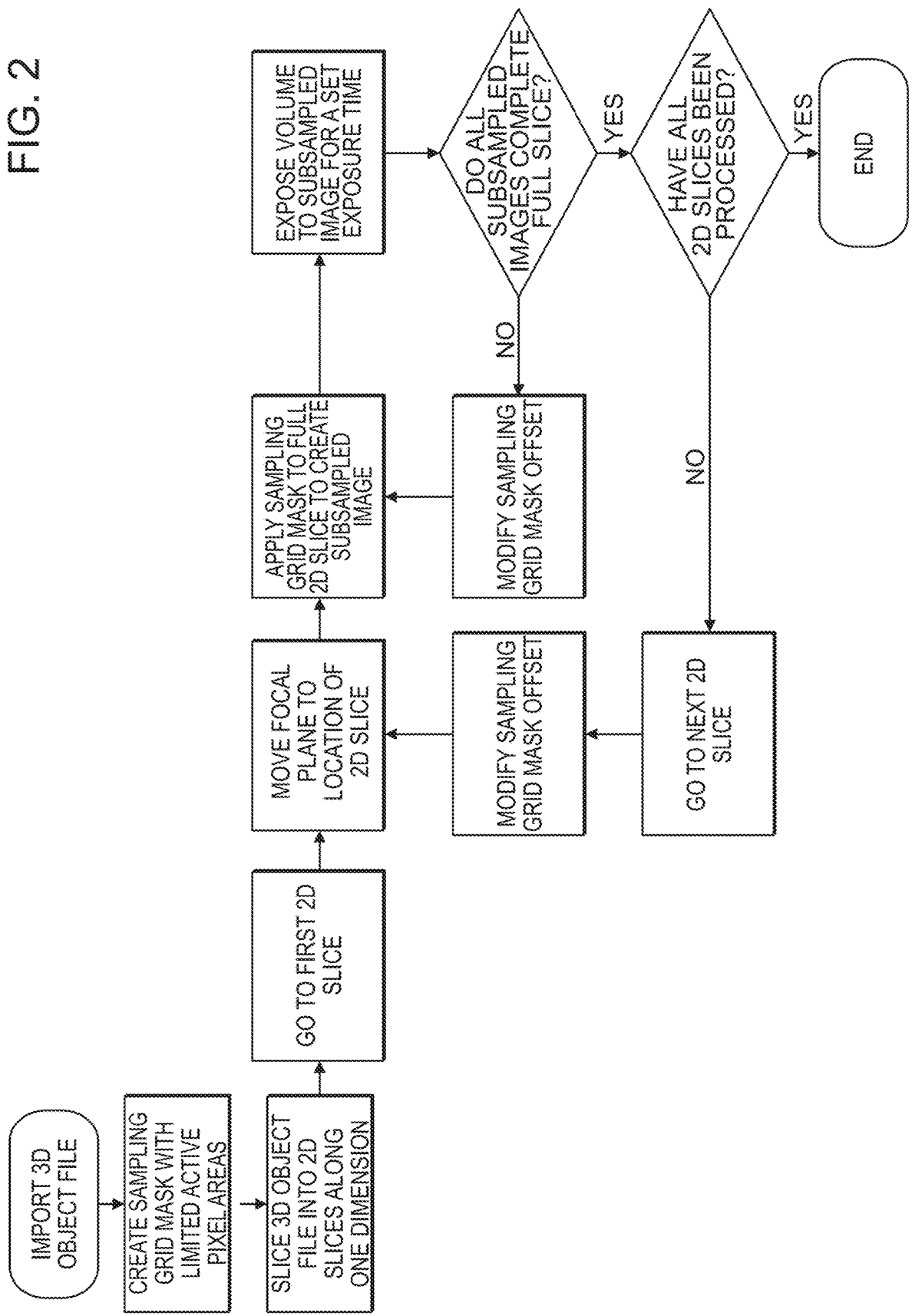
FIG. 2 is a flow chart for an example of a method in accordance with an aspect of the invention.

A flow chart for an example of a method in accordance with this aspect of the invention that further includes a slicing step is shown in FIG. 2. The example of the method outlined in FIG. 2 includes: importing a file for the 3D object to be printed; creating a sampling grid mask with limited active pixel areas (e.g., less than all the pixel areas are active); slicing the 3D object file into two-dimensional (2D) slices along one dimension (e.g., the z-dimension); selecting the first 2D slice, moving the focal plane to the location of the 2D slice; applying the grid mask to the full 2D slice to create a subsampled image; exposing the selected location in the volume to the subsampled image for a selected exposure time; if the 2D slice has not been fully exposed, create the next sequential distinct complementary subimage (e.g., including modifying the sampling grid mask offset and applying the offset sampling grid mask to the full 2D slice to create the next subimage; exposing the selected location for the subsampled image for a selected exposure time; and repeating the offset step to create the remaining subsampled images for the given slice and exposing the remaining subsampled images for the given slice until all of the subsampled images of the given slice have been exposed; if not all of the 2D slices have been processed, repeat the above steps for the first 2D slice for the remaining slices at the same or different selected locations in the volume until all 2D slices of the 3d object to be printed have been processed.

Before printing, a digital file of the three-dimensional object to be printed is obtained. The digital representation can be an existing digital file or can be a digital representation created, for example, by CAD, scanning, etc. If the digital file is not of a format that can be used to print the object, the digital file is then converted to a format that can be used to print the object. An example of a typical format that can be used for printing includes, but is not limited to, an STL file. The STL or other suitable digital file obtained for the three-dimensional object to be printed is also sliced into two-dimensional layers with use of three-dimensional slicer software and converted into G-Code or a set of machine commands, which facilitates building the object. See B. Redwood, et al., "The 3D Printing Handbook—Technologies, designs applications", 3D HUBS B.V. 2018.

A method in accordance with one or more aspects of the present invention preferably utilizes an STL file of the three-dimensional object to be formed that can be imported into Direct Machine Control (DMC) software.

Preferably, the digital representation of the three-dimensional object is scaled in the z dimension to account for index refraction in the photopolymerizable liquid before slicing the digital representation of the three-dimensional object.

Optionally, the digital file for the three-dimensional object to be formed can be scaled in x, y, and z dimensions to change size before the object is sliced. Preferably the size-scaled object is further scaled in the z dimension to account for index refraction in the photopolymerizable liquid before slicing the digital representation of the three-dimensional object.

All slice images of the object can be processed into a plurality of subsampled images at the outset before any subsampled image is projected into the photopolymerizable liquid. Alternatively, each slice image can be processed into subsampled images on a slice-by-slice basis before the first subsampled image of a slice is projected into the photopolymerizable liquid with excitation light.

Optionally, if all of the slices are processed into subsampled images at the outset, any slice can be reprocessed before projecting any subsampled image of the slice into the photopolymerizable liquid to address any changes that might be desired.

A subsampled image of a slice comprises of a plurality of pixels that form the subsampled image. The plurality of pixels of a subsampled image can be arranged in a repeating pattern of pixels. The plurality of pixels of a subsampled image can be arranged in a non-repeating pattern of pixels. A repeating pattern can be a regular pattern or any arbitrary (or irregular) pattern. The pixels of a subsampled image can include pixels of the same size. The pixels of a subsampled image can include pixels of different sizes. The pixels of a subsampled image can include two or more different sizes. The pixels of a subsampled image can include pixels of the same shape. The pixels of a subsampled image can include pixels of different shapes.

Each subsampled image includes less than all of the pixels of a slice.

Each subsampled image is preferably different from any other subsampled image of a given slice. Preferably, the combination of all of the subsampled images of a given slice creates a complete slice. More preferably, all of the pixels of a slice are not projected into the photopolymerizable liquid at once.

A pixel preferably comprises a grouping of adjacent pixels. A pixel can also be a single display pixel, the smallest image unit that can be displayed or projected by a spatial light modulator, DMD or display device. Preferably a grouping of adjacent pixels comprises the same number of pixels in both the x and y directions, e.g., 2×2, 3×3, 4×4, 5×5, 6×6, 7×7, 8×8, 9×9, etc. In some instances, the grouping can include up to 128×128 or possibly larger, depending on the size of the object and other selected features desired for the object to be formed. (A grouping of adjacent pixels may also be referred to herein as a "superpixel").

A pixel or superpixel can have a selected shape. For example, a pixel or superpixel can be square, rectangular, other geometric or arbitrary shape. A square shape pixel or superpixel is preferred.

Figure 3:
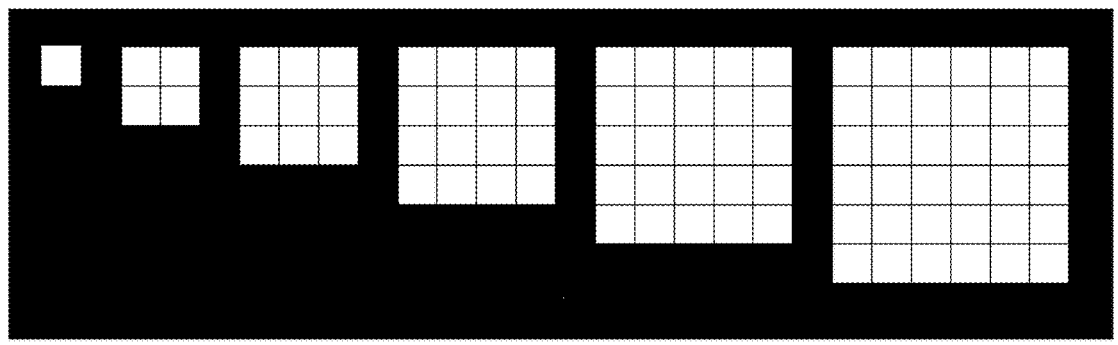
FIG. 3 depicts diagrams of examples of superpixels ranging from 1×1 to 6×6.

FIG. 3 depicts examples of a single pixel and superpixels ranging in size from 1×1 to 6×6.

Whether a subsampled image comprises an arrangement of single pixels, an arrangement of superpixels, or an arrangement including single pixels and superpixels, preferably, each pixel or superpixel, as the case may be, is separated from any other pixel or superpixel of the subsampled image by a distance. The distance can be greater than or equal to the larger of the x and y dimensions of the pixels or superpixels of the subsampled image. The distance can be approximately equal to the larger of the x and y dimensions of the pixels or superpixels of the subsampled image. The distance can be less than either the x or y dimensions of the pixels or superpixels of the subsampled image. For a superpixel, the distance can be less than, greater than, or equal to the larger of the x and y dimensions of a pixel included in the superpixel.

More preferably, each of the pixels or subpixels, as the case may be, of the subsampled image are separated from any other by at least a distance to prevent optical communication between them.

Optionally, the distance can be at least the width of a pixel or superpixel.

The pixel or superpixel size determines the minimum voxel size in the photopolymerizable liquid. The smaller the pixel or superpixel the smaller the voxel. A pixel or superpixel can be sized to create a selected minimum voxel size in the photopolymerizable liquid.

The term "voxel" is used herein to refer to the volume at a location in the photopolymerizable liquid where polymerization may occur A voxel may have a size dimension in a range, including, but not limited to, from about 5 microns to about 2 centimeters, from about 5 to about 10 microns, and from about 1 centimeter to about 2 centimeters. The range of voxel sizes that can be achieved is much wider than the above listed examples. Other ranges may also be achieved and used.

Figure 4:
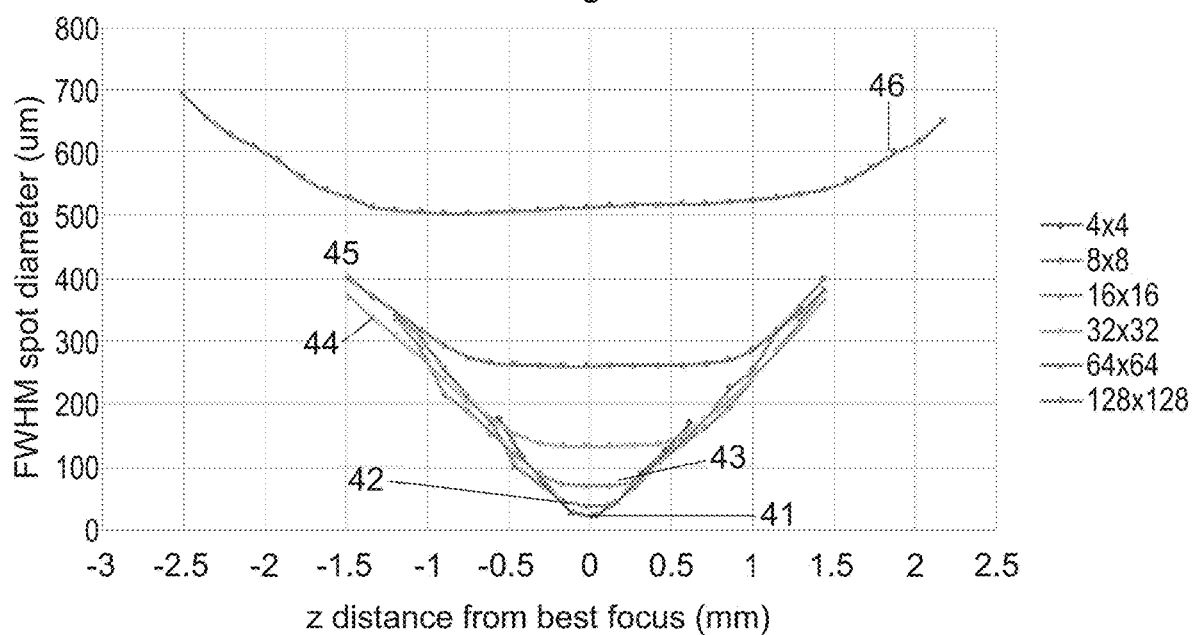
FIG. 4 depicts a plot demonstrating the effect of superpixel size on the voxel spot diameter of the as a function z distance from the best focus.

FIG. 4 illustrates a plot demonstrating the effect of superpixel size on spot diameter of the voxel. The plot shows full width at half maximum (FWHM) of the spot diameter (in microns) as a function of z-distance from best focus (in millimeters (mm)) in material with an index of refraction (n) for a range of superpixel sizes (4×4 (reference numeral 41), 8×8 (reference numeral 42), 16×16 (reference numeral 43), 32×32 (reference numeral 44), 64×64 (reference numeral 45), and 128×128 (reference numeral 46)). The data shown in the plot are generated with a Beam Profiler measured outside of a photopolymerizable liquid, corrected for the index of refraction of the liquid. From the plot, better z-resolution is expected with decreasing superpixel size.

Advantageously, separation of the pixels or superpixels, as the case may be, can achieve improved the resolution of the three-dimensional object formed.

Figure 5A:
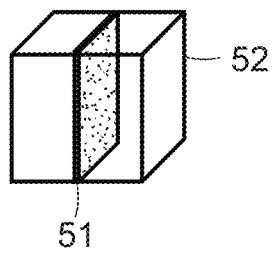
FIG. 5A schematically illustrates an example of a two-dimensional slice image of a three-dimensional part to be printed and FIG. 5B depicts an example of a grid 53 including the two-dimensional slice 51.
Figure 5B:
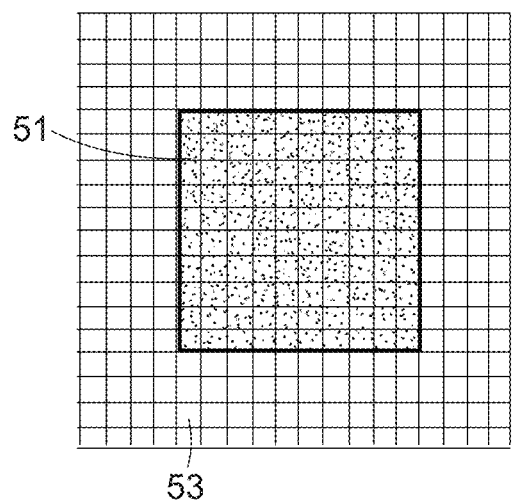
Figure 5C:
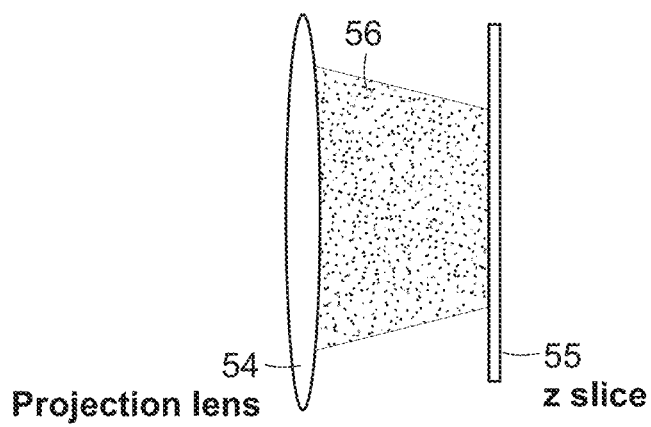
FIG. 5C schematically depicts an example of when all the pixels of the slice are simultaneously projected into a volume of a photopolymerizable liquid to a selected location (labeled "z slice") with excitation light which gives poor resolution.

FIG. 5A schematically illustrates an example of a two-dimensional slice 51 of a three-dimensional part 52 to be printed and FIG. 5B depicts an example of a grid including the slice. FIG. 5C schematically depicts an example of when all the pixels of the slice are simultaneously projected from a projection lens 54 into a volume of a photopolymerizable liquid (not shown) to a selected location 55 (labeled "z slice") with excitation light 56. Printing all of the pixels of the slice at the same time, as shown in FIG. 5C, gives poor resolution. In contrast, as shown in FIGS. 6A-D and 6E, projecting separated pixels or subpixels, as described herein, to the selected z-location can give better resolution than obtained when printing all of the pixels or subpixels of a slice at the same time.

Figure 6A:
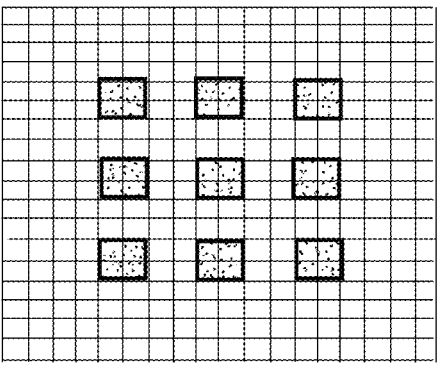
FIGS. 6A-6D schematically illustrate four examples of grids including successive subsampled images including separated pixels (e.g., 2×2 superpixels) for sending to a spatial light modulator (e.g., a digital micromirror device (DMD) to fill out or print the original two-dimensional slice image 51.
Figure 6B:
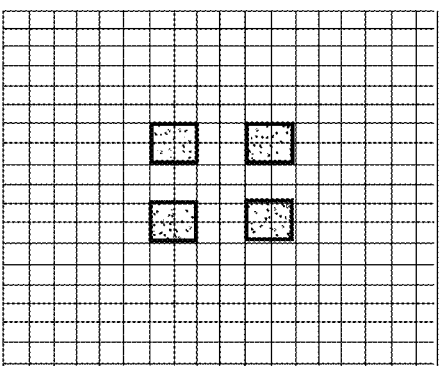
Figure 6C:
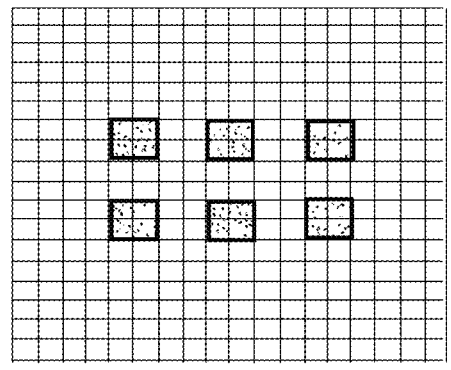
Figure 6D:
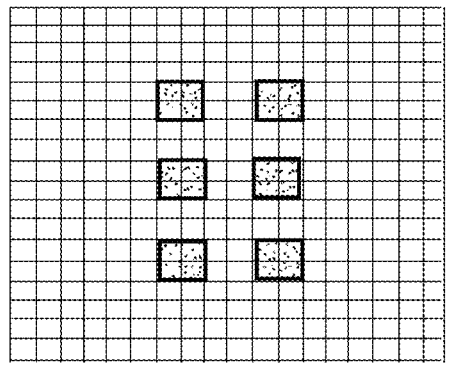
Figure 6E:
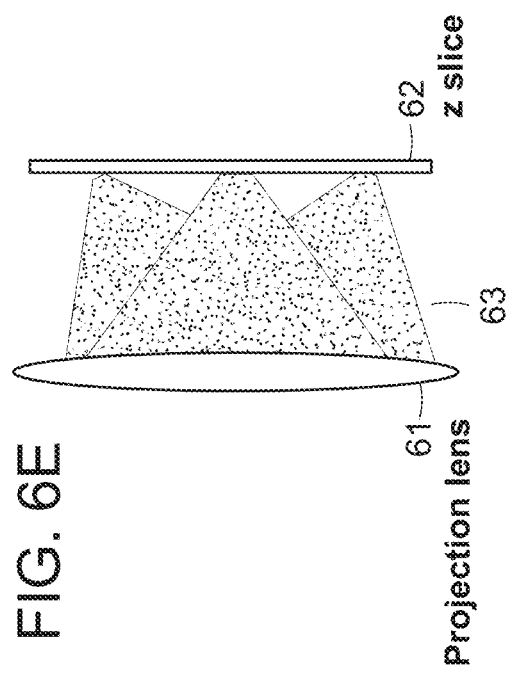
FIG. 6E schematically depicts an example of when the pixels or superpixels of the slice are projected into a volume of a photopolymerizable liquid to a selected located (labeled "z slice") with excitation light—as a sequence of subsampled images including separated pixels or superpixels.

FIGS. 6A-6D schematically illustrate examples of grids including four successive subsampled images (also referred to herein as subimages) including separated pixels (e.g., shown for purposes of example as 2×2 superpixels) for a given 2-dimensional slice of an object. The four successive subimages are sent to a spatial light modulator (e.g., a digital micromirror device (DMD) to fill out or print the given two-dimensional slice image. FIG. 6E schematically depicts an example of projection of separated pixels of a sub-sampled image of the slice from a projection lens 61 into a volume of a photopolymerizable liquid to a selected located (labeled "z slice") 62. Projection of a slice as a sequence of subsampled images including separated pixels or superpixels to the selected location where the slice is to be printed can achieve better resolution than obtained by printing all pixels or superpixels of the slice at once.

The pixels or superpixels of a slice and the pixels or superpixels of a subsampled image are preferably arranged in a grid. The grid spacing can determine how far each pixel or superpixel is from the other pixels or superpixels. The spacing of the pixels or superpixels determines the duty cycle, which is how many pixels are on (or active) compared to how many pixels are off (or inactive). Most prints are preferably printed at a 1% duty cycle. Optionally, software can be used to round all spacing between the pixels or superpixels to an integer multiple of the pixel or superpixel offset distance to ensure that the entire image has uniform exposure. The grid of a subsampled image of a given slice can be the same as or different from the grid of the previously formed slice.

The grid of a subsampled image of a given slice can be shifted by a selected distance in relation to that of the previously printed subsampled image of the given slice to create an offset between the two subsampled images.

For example, a subsampled image of a given slice can be offset by one or more pixels from the previously exposed subsampled image of the given slice. As discussed herein, larger or smaller offset distances may also be suitable.

Preferably the offset reduces, and preferably avoids, occurrence of irregularities at a surface or in the volume of the three-dimensional object that is formed.

An example of a square grid is shown in FIG. 7A. An example of an hexagonal grid is shown in FIG. 7B.

FIGS. 8A-8C show examples of 4×4 superpixels with different grid spacings. For example, the image in FIG. 8A shows 4×4 superpixels with an 8 pixel spacing between the superpixels. The image in FIG. 8B shows 4×4 superpixels with a 20 pixel spacing between the superpixels. The image in FIG. 8C shows 4×4 superpixels with 40 pixel spacing between the superpixels. Other spacings can also be used.

Within each slice of the three-dimensional object or subsampled image, the sampling grid offset can be used to determine how much the pixel or superpixel is shifted compared to the previously exposed slice or subsampled image, as the case may be. The offset is preferably the pixel or superpixel size. However, the offset can be less than the pixel or superpixel size to create more overlap. Alternatively, the offset can be more than the pixel or superpixel size to address or account for optical overlap.

FIGS. 9A-9D illustrate examples of a 4×4 superpixel with different offset values. The shaded pixels represent pixels that were "on" in the first exposure and were turned off for the second exposure. The white pixels represent pixels that are "on" in the second exposure. FIG. 9A represents a 1 pixel width offset 901; FIG. 9B represents a 2 pixel width offset 902; FIG. 9C represents a 3 pixel width offset 903; and FIG. 9D represents a 4 width pixel offset 904.

To improve uniformity of the print, the entire grid pattern can be created in two different ways and also shifted between slices by a set number of pixels. In addition, the pixel or superpixel movement direction can also be changed by cycling through a set of four different ways to expose the overall grid. Optionally, more patterns can be added to improve uniformity of the final three-dimensional object that is printed or formed.

Figure 10A:
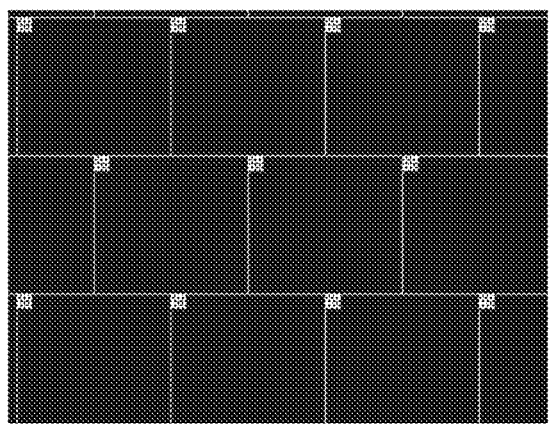
FIGS. 10A and 10B depict a representation of an example of a hexagonal lattice with the grid split into two different patterns.
Figure 10B:
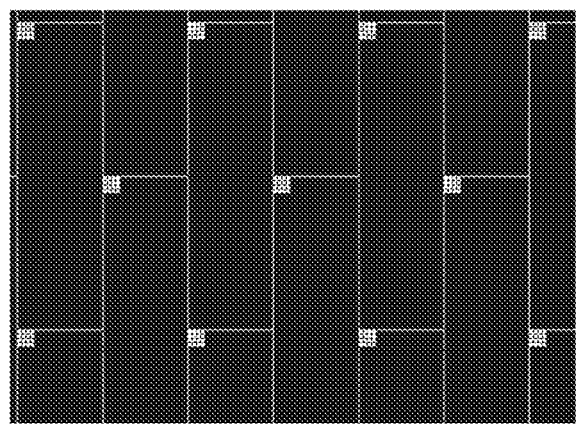

For example, a hexagonal lattice or grid pattern can be split up in two different ways. This can facilitate improved printing uniformity and complete coverage of the entire image. Examples are shown in FIGS. 10A & 10B. FIG. 10A depicts a representation of an example of a hexagonal lattice with the grid split into a square pattern. FIG. 10B depicts a representation of an example of a hexagonal lattice with the grid split into a rectangular pattern.

Between each slice or subsampled image the entire grid can also optionally be shifted by a set number of pixels or superpixels. This shift or offset is to stagger the grid lines between slices or subsampled images to create a more uniform print.

Figure 11A:
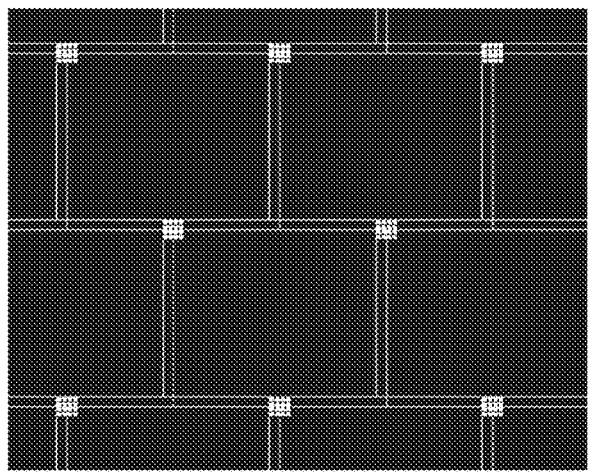
FIGS. 11A and 11B depict representations of examples of a grid patterns similar to that shown in FIGS. 10A and 10B with an overlying grid pattern for a subsequently printed subsampled image (of the same slice or subsequent slice) that is shifted or offset by dimensions of a 2×2 pixels. The superpixel (shown in white) has dimensions of 4×4 pixels.
Figure 11B:
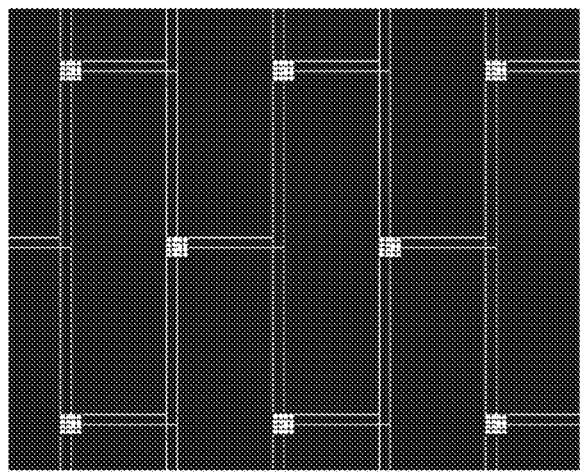

FIGS. 11A & 11B depict representations of examples of a grid patterns similar to that shown in FIGS. 10A and 10B with an overlying grid pattern for a subsequently printed subsampled image (of the same slice or subsequent slice) that is shifted or offset by dimensions of a 2×2 superpixel. FIG. 11A shows an example of a grid for a hexagonal lattice split into a square pattern and the same grid offset by a 2×2 pixels (e.g., 2 pixels in each of the x and y directions). FIG. 11B shows an example of a grid for a hexagonal lattice split into a rectangular pattern and the same grid offset by a 2×2 pixels (e.g., 2 pixels in each of the x and y directions). The superpixel size in this example is 4×4 pixels.

Within the grid, the pixel or superpixel can be scanned or moved in multiple directions when exposing the subsampled images and slices. Scanning directions include horizontal, vertical and diagonal directions. Four non-limiting examples of directions are shown in FIGS. 12A-12D. These examples include: as depicted in FIG. 12A, starting at the top left and moving left to right with a next pass also moving from left to right; as depicted in FIG. 12B, starting at the top right and moving right to left with the next pass also moving from right to left; as depicted in FIG. 12C, starting at the bottom left and moving left to right with the next pass is also moving from left to right; and as depicted in FIG. 12D, starting at the bottom right and moving right to left with the next pass also moving from right to left. In the examples depicted in FIGS. 12A and 12B, the top arrow 1201 indicates the first direction and the bottom second arrow 1202 shows the next pass, moving from the top to bottom; in the examples shown in FIGS. 12C & 12D, the bottom arrow 1203 indicates the first direction and the top arrow 1204 shows the next pass, moving from the bottom to top.

When printing the three-dimensional object, each slice or subsampled image can alternate through both the grid pattern, the grid offset, as well as the pixel or superpixel movement direction. This can create a slightly different exposure from slice to slice or subsampled image to subsampled image and can thereby avoid overlapping a set grid. Such alternation can create more uniform exposure through the entire print. With use of a repeating grid in printing the subsampled images of a slice, once the entire grid has been exposed, the entire slice has been exposed.

In an aspect of the present invention including a sampling grid mask, a sampling grid mask preferably includes pixels or superpixels, as the case may be, with a selected set size and a selected grid spacing. The position of the pixels or superpixels is determined be previous exposures, accounting for the pixel and slice offset. The mask is then overlayed on, multiplied or logically AND-ed with the sliced image to create the subsampled image to be exposed. This is repeated until the entire slice is exposed before moving to the next slice in the sequence.

To expose the photopolymerizable liquid (also referred to herein as a resin) a mask with the selected pixel or superpixel size with the grid spacing and layout is created. The position of the pixels or superpixels is determined by previous exposures accounting for the pixel or superpixel and slice offset. The mask is than overlayed on the sliced image to create the exposure. This is repeated until the entire slice is exposed before moving on to the next slice.

Figure 13A:
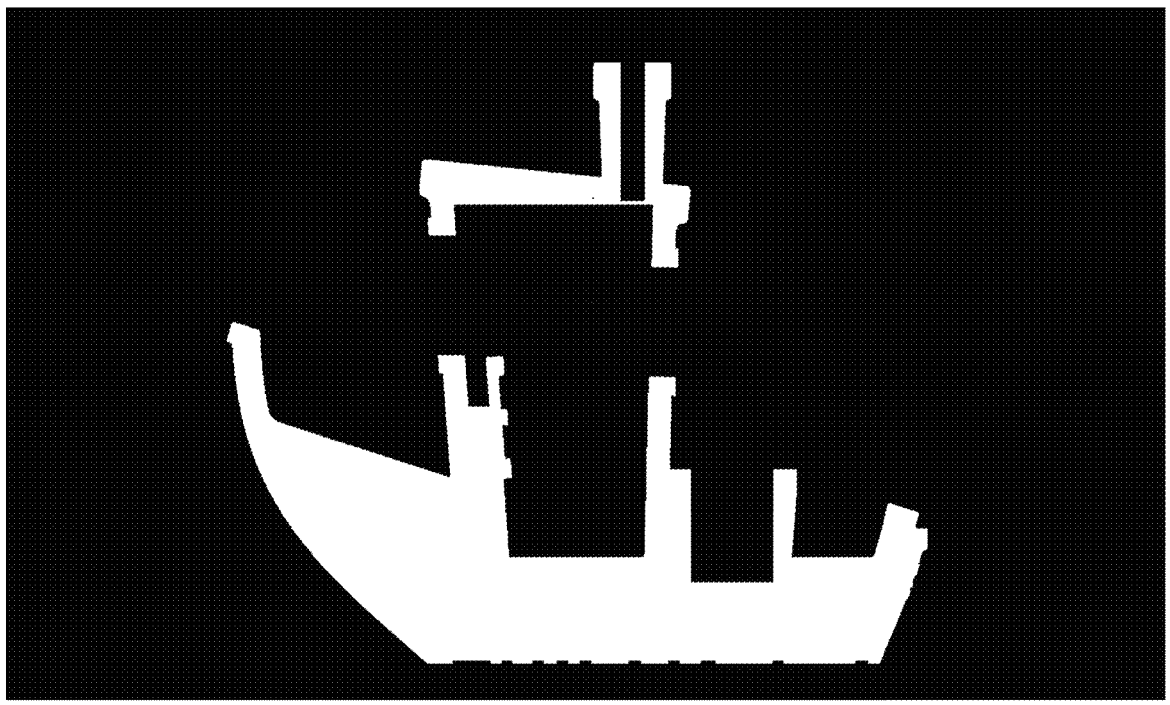
FIGS. 13A & 13B respectively depict examples of a full slice of an object and a sample grid mask that can be included in an example of a method in accordance with one or more aspects of the present invention.
Figure 13B:
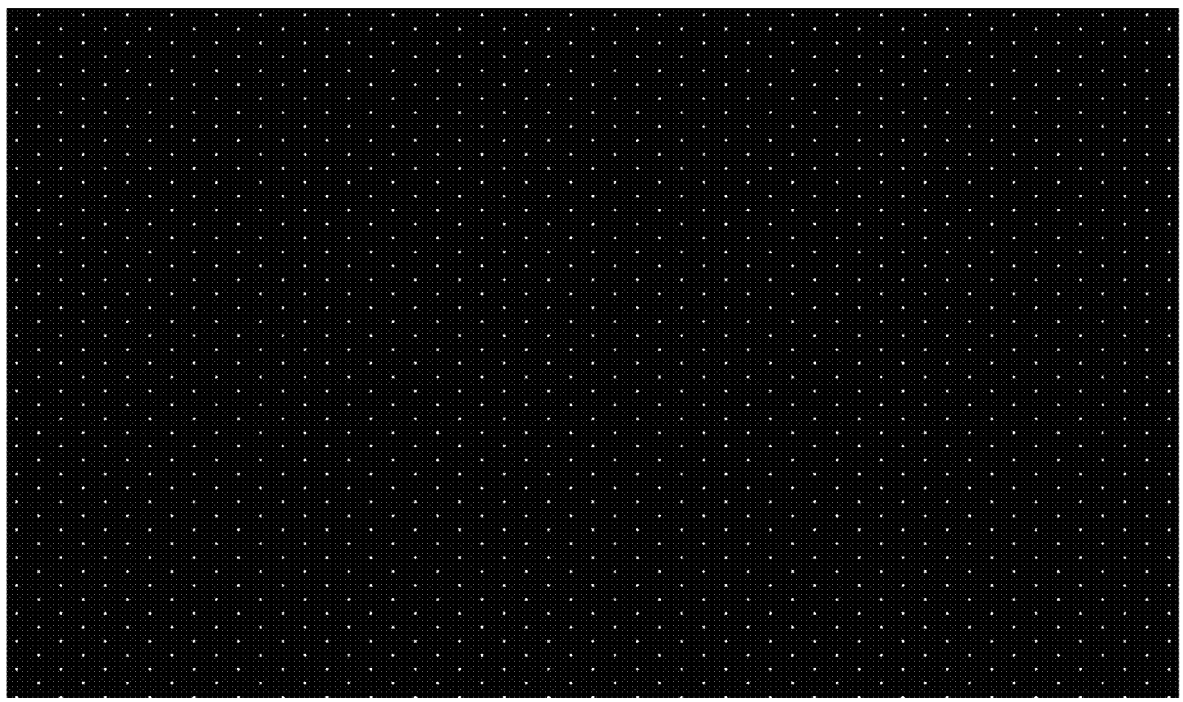

FIG. 13A illustrates an example of a complete or full slice of a three-dimensional object and FIG. 13B illustrates an example of a sampling grid mask.

Figure 14:
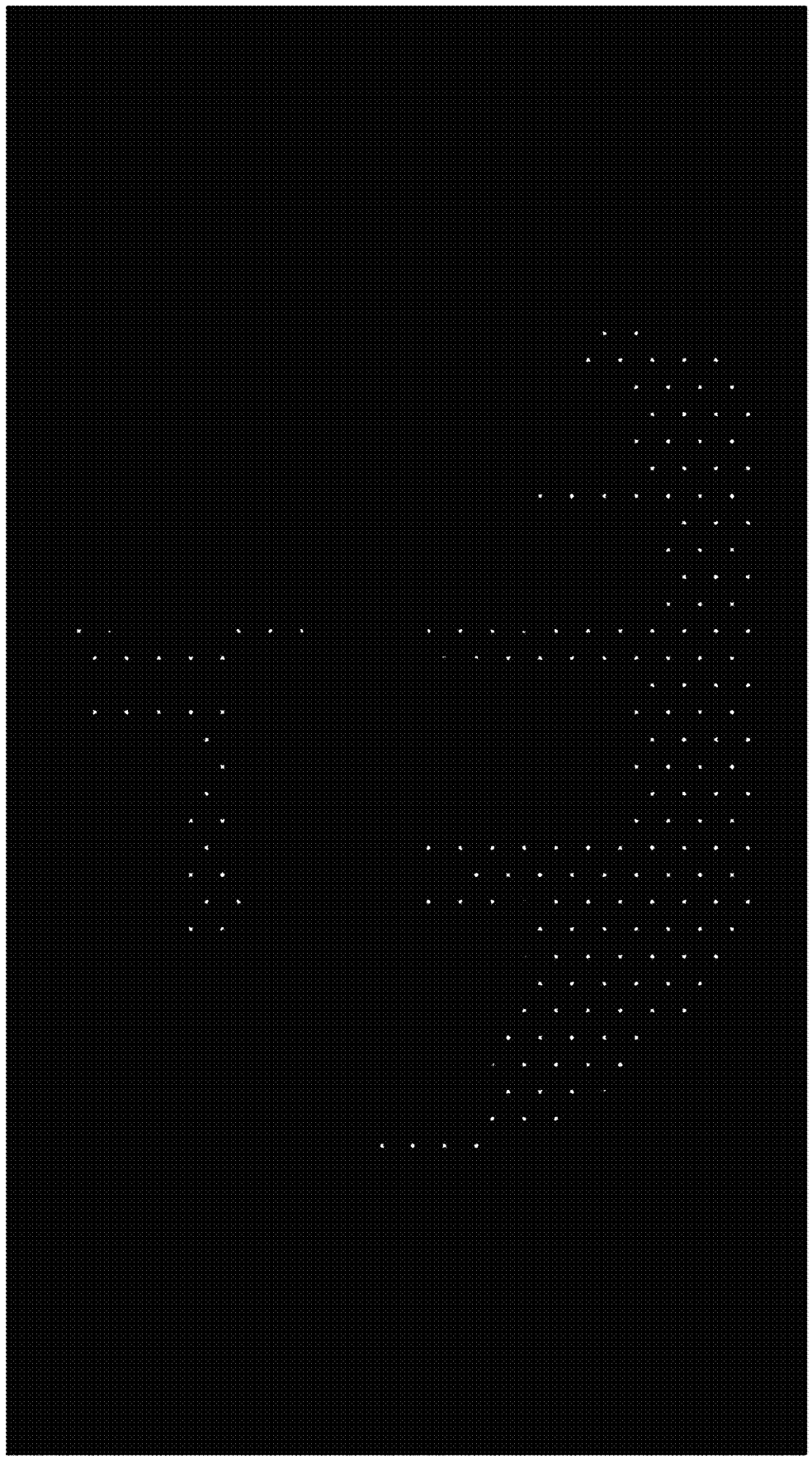
FIG. 14 depicts an example of a subsampled image formed in the photopolymerizable liquid when only pixels common to both of the sliced image and sample grid mask image (pixel-wise multiplied or logically AND) are projected into the photopolymerizable liquid with excitation light.

Combining a sliced image (e.g., as shown in FIG. 13A) and a grid mask (e.g., as shown in FIG. 13B) and only turning on (or projecting) pixels that are "on" in both (shown in white) creates a subsampled image of the sliced image (e.g., as shown in FIG. 14). For a slice, this masking process is repeated until all of the subimages of the entire slice are exposed. For a slice, this masking process is repeated until the entire slice is exposed.

FIG. 14 depicts an example of a subsampled image formed in the photopolymerizable liquid when only pixels common to both of the sliced image and sample grid mask image (pixel-wise multiplied or logically AND) are projected into the photopolymerizable liquid with excitation light.

Figure 15A:
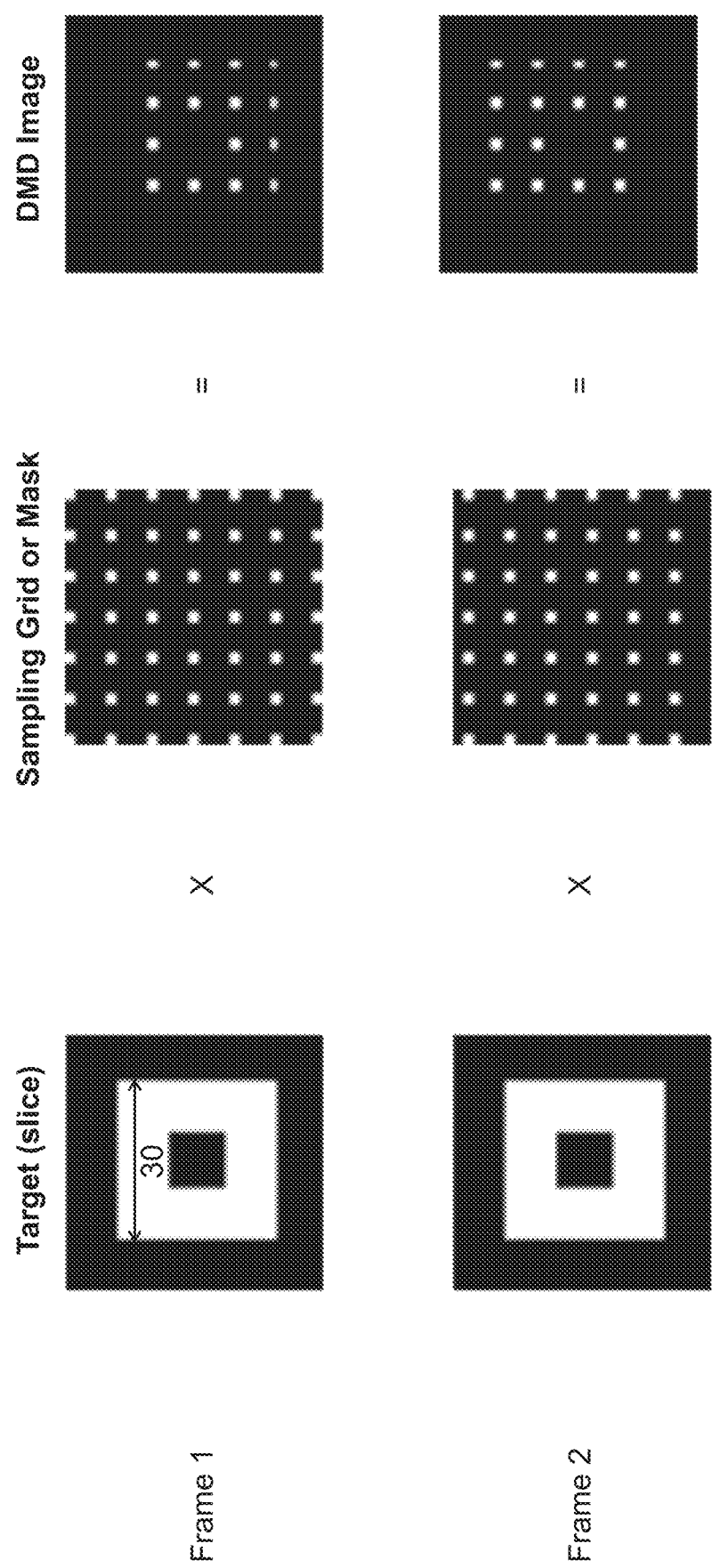

Other examples of subsampled images formed when only pixels common to both of the sliced image and sample grid mask image (pixel-wise multiplied or logically AND) are shown in FIGS. 15A & 15B.

FIG. 15A depicts two frames of the algorithm where a target slice image is multiplied or logically AND-ed with a sampling grid or mask resulting in a subsampled DMD image which is projected into the resin. In this example, the original slice image is 50×50 pixels in dimension. The largest spatial extent of active pixels in the slice image is 30 pixels wide. The sampling grid consists of superpixels that are 2×2 pixels in size on a sampling grid of 8×8 pixels. After multiplication the resulting subsampled DMD image has active pixel areas that have a limited spatial extent of no more than 2×2 pixels.

FIG. 15B depicts a non-limiting example of a sequence of sixteen frames of susbsampled images of the target slice image and the resulting composite images after each frame. (Sequences including lower or higher numbers of frames can be used.) Each displayed frame has active pixel areas that have a limited spatial extent of no more than 2×2 pixels. After sixteen frame the composite image equals the desired target slice image. (Orientation directions for the drawing are also shown; the z direction (not shown) is perpendicular to the depicted images.)

To account for absorption of the excitation light throughout the photopolymerizable resin, the power of the excitation light source is preferably adjusted before each exposure. Such adjustment can help achieve a voxel size that is constant throughout the print in z.

In instances in which a slice may not be fully cured during the initial sequence of exposing a full set of sequenced subsampled images of the slice, exposing the sequence of subsampled images of the slice can be repeated to further expose the photopolymerizable liquid for curing.

This can be desirable, for example, to fully cure the slice to control the z-dimension of the slice.

Alternatively, in certain instances it may be desirable to fully expose a full set of subsampled images of a slice without fully curing the slice. This may be desirable, for example, to avoid slicing artifacts in the printed part or to allow for additional curing after the part is removed from the liquid.

Methods in accordance with one or more aspects of the present invention include sequentially projecting each of the subsampled images of a slice to a selected location along the z-direction in the volume of the photopolymerizable liquid with excitation light until the volume of the photopolymerizable liquid at the selected location along the z-direction has been exposed to all of the subsampled images of the slice.

Excitation light preferably has a wavelength selected for initiating photopolymerization of the photopolymerizable liquid.

Subsampled images are preferably generated with use of a spatial light modulator, more preferably an imaging digital micromirror device (DMD) with selected pixels turned on (also referred to as active). For example, the first spatial light modulator, preferably with a uniform excitation light source, generates an optical projection of focused two-dimensional subsampled image in the x-y plane and projects the two-dimensional subsampled image to a selected position along the projection z-direction. The position of focus within the volume can be changed by translating the spatial light modulator or the position of the volume of the photopolymerizable liquid.

Preferably the power density of the excitation light can be adjusted to account for absorption of the excitation light in the volume in the z-direction before projection or exposure of a first subsampled image of a subsequent slice is initiated.

Preferably the power density of the excitation light can be adjusted to account for absorption of the excitation light in the volume in the x,y-direction before projection or exposure of a first subsampled image of a subsequent slice is initiated.

Preferably the power density of the excitation light can be adjusted to account for absorption of the excitation light in the volume in the z-direction and in the x,y-dimensions before projection or exposure of a first subsampled image of a subsequent slice is initiated.

Preferably the power density of the excitation light can be adjusted to account for absorption of the excitation light in the volume in the z-direction and/or in the x,y-dimensions before projection or exposure of any subsampled image of a subsequent slice is initiated.

Preferably less than 10% of the pixels in a slice are illuminated by excitation light at the same time. More preferably, no more than 1% of the pixels in a slice are illuminated by excitation light at once. Most preferably, less than 1% of the pixels in slice are illuminated by excitation light at once.

Preferably a subsampled image of a given slice comprises less than 10% of the pixels included in the given slice. More preferably each of the pixels of the subsampled image are separated from any other pixel of the subsampled image by a limited spatial extent or distance.

Preferably all pixels of a subsampled image are projected simultaneously.

The intensity of the optical projection of excitation light is preferably sufficient to locally polymerize the photopolymerizable liquid at the selected location along the z-direction.

Power density may also be referred to herein as intensity.

The present invention advantageously facilitates printing three-dimensional objects in a volume of photopolymerizable liquid at a distance or depth of about 1 cm or greater from the interface of the photopolymerizable liquid and the inside surface of the container in which it is contained.

The present invention advantageously further does not require adhering the object being printed to a fixed substrate (e.g., build plate) at the beginning of the printing process avoiding a post-processing step of separating the printed object from the fixed substrate.

The present invention advantageously yet further facilitates printing three-dimensional objects in a volume of photopolymerizable liquid without requiring support structures to form a printed object.

Post-processing steps of removing support structures and/or removing the printed object from a fixed substrate add labor (e.g., manual removal), waste (discarded support structures), and reduce throughput (a build plate cannot be reused until the printed object is removed), all of which add cost to the process.

The methods of the present invention include directing an optical projection of excitation light from an optical projection system into a volume of photopolymerizable liquid.

The methods described herein can further comprise removing the formed three-dimensional object from the container. Following removal from the container, the completed object can be further processed. Examples of further processing include, without limitation, a post-curing step to complete any partial polymerization, washing the formed three-dimensional object, packaging, etc.

Examples of optical projection systems for use in the methods described herein include, but are not limited to, laser projection systems, a liquid crystal display (also referred to herein as "LCD"), a spatial light modulator (for example, but not limited to, a digital micromirror display (also referred to herein as "DMD")) projection system, a liquid crystal on silicon (also referred to herein as "LCoS") projector), a micro-LED array (also referred to herein as "µLED"), an LED array, a vertical cavity laser (also referred to herein as "VCL"), a vertical cavity surface emitting laser (also referred to herein as "VCSEL"), scanning laser systems, and scanning spot projectors.

A preferred optical projection system for use in the methods described herein includes a spatial light modulator projection system including a spatial light modulator and a light source. In a more preferred optical projection system, the spatial light modulator comprises a digital micromirror device. A spatial light modulator projection system can typically further include one or more lenses and/or other projection optics.

The excitation light directed into the photopolymerizable liquid can be preferably generated with an optical projection system including a spatial light modulator and a focused light source.

When focused projection is used, the optical projection of excitation light generated with the optical projection system is projected to a selected focus position within the volume of the photopolymerizable liquid, calling for translational movement of the optical projection system or the container including the volume of the photopolymerizable liquid to move the focus position to continue printing the three-dimensional object.

The optical projection system and the container including the volume of photopolymerizable liquid can optionally be movable in one or more of the x, y, and z directions in relation to each other.

Examples of light sources of the excitation light for use in the methods described herein include lasers, laser diodes, light emitting diodes, light-emitting diodes (LEDs), micro-LED arrays, vertical cavity lasers (VCLs), vertical cavity surface emitting lasers (VCSELs), and filtered lamps. Such light sources are commercially available and selection of a suitable light source can be readily made by one of ordinary skill in the relevant art.

A light source can be coherent or incoherent. An incoherent light source can be preferred. An incoherent light source is simpler to use and avoids having to address considerations such as, for example, phase and interference considerations, that can arise with use of a coherent light source.

When a photopolymerizable liquid including an upconverting component is included in the method, the wavelength of a light source is preferably selected based on the absorption characteristics of the upconverting component in the photopolymerizable liquid, as discussed in more detail below. For example, the excitation light including light at the first wavelength for exciting the upconverting component can be preferred. (Photopolymerizable liquids including an upconverting component are described below.

Excitation light can have a wavelength in the visible or invisible spectral range.

The intensity of an optical projection of excitation light is preferably selected so that a single projection has sufficient intensity to polymerize the photopolymerizable liquid.

Power densities or intensities of excitation light directed into the volume of photopolymerizable liquid to cause polymerization to occur may be, without limitation, less than 1000 W/cm$^2$, less than 500 W/cm$^2$, less than 100 W/cm$^2$, less than 50 W/cm$^2$, less than 10 W/cm$^2$, less than 5 W/cm$^2$, less than 1 W/cm$^2$, less than 500 mW/cm$^2$, less than 100 mW/cm$^2$, etc.

Most preferably, a quadratic or higher relationship exists between the power of the excitation light and emission from the annihilator.

Optionally, the excitation light can be temporally and/or spatially modulated. Optionally, the intensity of the excitation light can be modulated. Optionally, source drive modulation can be used, for example, to adjust the absolute power of the light beam.

Spatially modulated excitation light can be created by known spatial modulation techniques, including, for example, a liquid crystal on silicon device, and a digital micromirror device. Other known spatial modulation techniques can be readily identified by those of ordinary skill in the relevant art.

An optical projection system for use with the present invention can be selected to apply continuous excitation light. An optical system can be selected to apply intermittent excitation light. Intermittent excitation can include random on and off application of light or periodic application of light. Examples of periodic application of light includes pulsing. The optical system can be selected to apply a combination of both continuous excitation light and intermittent light, including, for example, an irradiation step that includes the application of intermittent excitation light that is preceded or followed by irradiation with continuous light.

An optical projection system can further include additional components including, but not limited to, lenses, other optical components, translational stages for moving the system or components thereof.

The methods disclosed herein can also include the use commercially available projection and filtering techniques that can assist in providing a very narrow depth of focus or systems.

Optionally, an optical projection system comprising a spatial light modulator may be utilized with incoherent light as an amplitude modulator in combination with projection lens to form images in the photopolymerizable liquid for amplitude base projections.

Optionally, an optical projection system comprising a spatial light modulator may be utilized or as a wavefront encoding device to form a phase or complex amplitude modulation on the wavefront in a holographic configuration.

Figure 16:
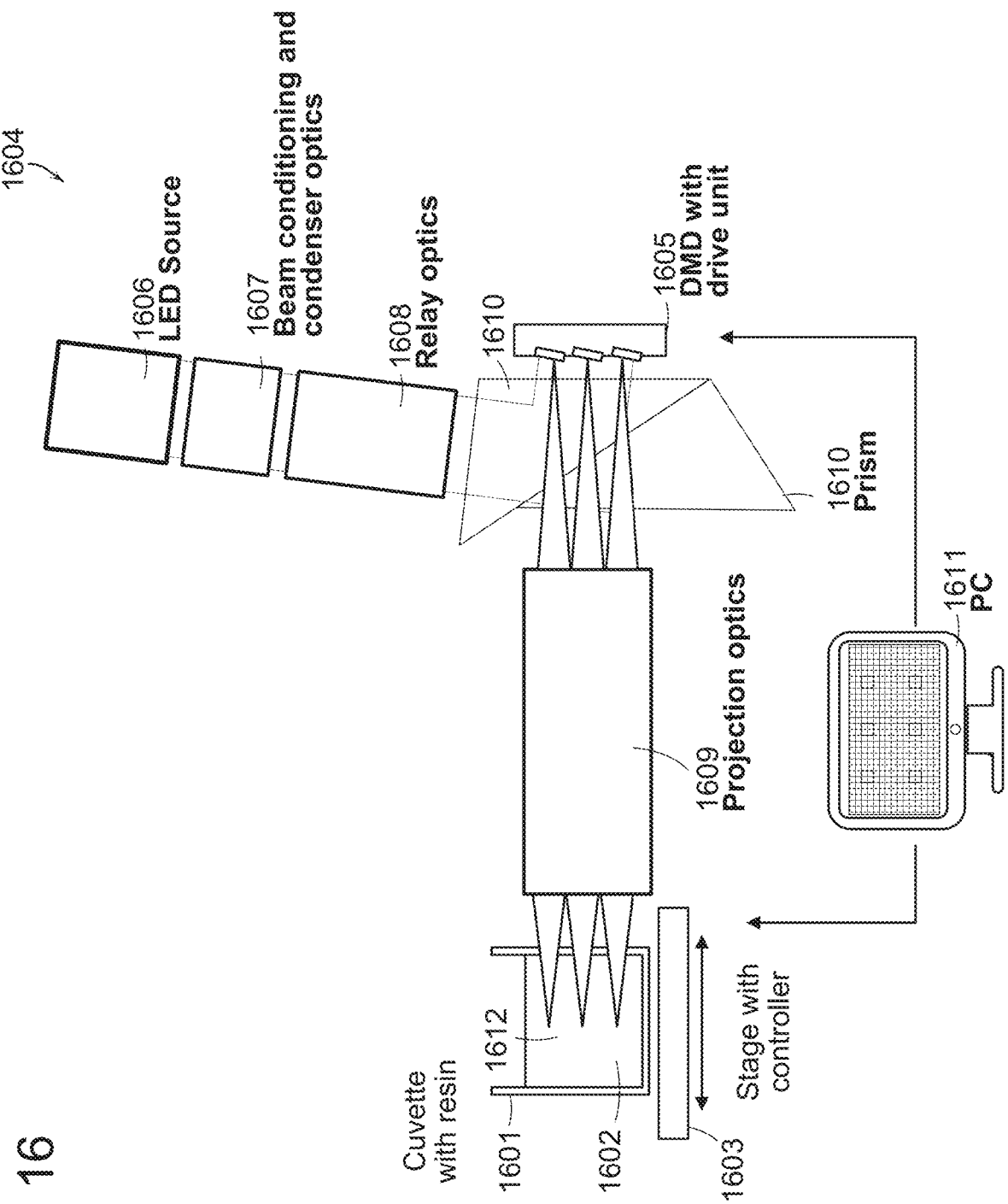
FIG. 16 schematically depicts an example of a system for use in a method in accordance with one or more aspects of the present invention.

FIG. 16 schematically illustrates an example of a system for inclusion in a method in accordance with a method in accordance with one or more aspects of the present invention.

A preferred system for volumetric three-dimensional printing includes a stage for supporting a container including a photopolymerizable medium, an optical projection system comprising a digital micromirror array, the optical projection system being positioned in relation to the stage for projecting optical projections in a direction orthogonal to the stage, and a set of projection optics, wherein the set of projection optics is positioned between the spatial light modulator and the stage, an excitation source, preferably a laser, in combination with high numerical aperture relay optics positioned to illuminate the optical projection system, wherein the optical projection system is adapted for connection to a computer for controlling optical projections therefrom.

Projection optics in the methods and systems typically can include one or more lenses and/or mirrors.

Optionally, the optical projection system is supported on a stage that is at least translationally movable in one or more of the x, y, and z directions.

A schematic of an example of a system for use in methods in accordance with one or more aspects of the invention is illustrated in FIG. 16. The depicted system includes a container 1601 (e.g., a cuvette) including a photopolymerizable liquid or resin 1602. As depicted, the container is supported on a translation stage 1603. The translation stage can include or be in communication with a controller. An optical projection system is positioned relative to the container to direct a two-dimensional image along a projection axis and orthogonal thereto.

In the figure, the optical projection system 1604 includes a DMD (designated in the figure as "DMD with drive unit") 1605, a light source 1606 designated as LED source in combination with beam conditioning and condenser optics 1607 and relay optics 1608 positioned to illuminate the DMD. A light source comprising a laser can be preferred. Projection optics 1609 are positioned between the DMD and container for magnifying and projecting a focused first optical projection of excitation light comprising a two-dimensional image into the container. Optionally, prisms 1610 can be positioned between the DMD and projection optics. In the depicted example, a subimage of a slice is projected to a selected z-location in the volume 1612.

In the example depicted in FIG. 16, the position of the focused two-dimensional image in the photopolymerizable liquid is changed to a different selected position by translational movement of the container along the projection axis. Alternatively, the DMD could be moved along the projection access to change the position of the focused two-dimensional image in the photopolymerizable liquid.

A computer (designated as "PC") 1611 is also shown. Software can be used to coordinate generation of the desired two-dimensional pattern from the spatial light modulator so that the part is developed plane by plane along the z axis with high axial resolution. Selection of computer controls and software is within the skill of the person of ordinary skill in the relevant art.

As depicted, the optical projection system comprises a spatial light modulator (e.g., an LCOS, DMD, LCD, or µLED).

A photopolymerizable liquid can comprise a photopolymerizable component. Photopolymerizable components are discussed in more detail below. A photopolymerizable liquid can further include a photoinitiator.

The methods of the invention preferably include a photopolymerizable liquid that includes (i) a photopolymerizable component; (ii) an upconverting component for absorbing light at a first wavelength and emitting light at a second wavelength, the second wavelength being shorter than the first wavelength; and (iii) a photoinitiator that initiates polymerization of the photopolymerizable component upon excitation by light at the second wavelength.

Optionally, the photopolymerizable liquid further includes an inhibitor component. An inhibitor can adjust reactivity which can further improve printing resolution, increase shelf life, or other benefits. An example of a preferred inhibitor includes TEMPO radical (2,2,6,6-Tetramethylpiperidin-1-yl)oxyl free radical).

A photopolymerizable component included in the photopolymerizable liquid may be any photopolymerizable resin or monomer suitable for the mechanism to be used to trigger the polymerization (radical mechanism, ionic mechanism, etc.). Examples of photopolymerizable components that may be included in the photopolymerizable liquid include, for example, without limitation, monomers, oligomers or polymers which can be polymerized by the radical route by addition or crosslinking mechanisms such as: acrylated monomers, such as acrylates, polyacrylates, methacrylates, or -acrylated oligomers such as unsaturated amides, or -methacrylated polymers, polymers which have a hydrocarbyl skeleton and pendant peptide groups with a functionality which can be polymerized by free radicals, or vinyl compounds such as styrenes, diallyl phthalate, divinyl succinate, divinyl adipate and divinyl phthalate, or -mixtures of several of the above monomers, oligomers or polymers, cationically polymerizable monomers and oligomers and cationically crosslinkable polymers, for example epoxy resins such as monomeric epoxies and polymeric epoxides having one or more epoxy groups, vinyl ethers, etc. and mixtures of several of these compounds.

Additional information concerning photopolymerization resins and monomers that may be useful can be found in in WO2019/025717 of Baldeck, et al., published Feb. 7, 2019, International Application No. Application No. PCT/US2019/063629, of Congreve, et al., filed Nov. 27, 2019, each of which is hereby incorporated herein by reference in its entirety.

An upconverting component comprises one or more compositions that alone or in combination can absorb light at a first wavelength and emit light at a second wavelength, the second wavelength being shorter than the first wavelength.

An upconverting component can preferably comprise upconverting nanoparticles for absorbing light at a first wavelength and emitting light at a second wavelength, the second wavelength being shorter than the first wavelength. The upconverting nanoparticles preferably include a sensitizer and an annihilator, the sensitizer being selected to absorb light at a first wavelength and the annihilator being selected to emit light at a second wavelength after transfer of energy from the sensitizer to the annihilator, the second wavelength being shorter than the first wavelength.

Upconverting nanoparticles preferably have an average particle size less than the wavelength of the exciting light. Examples of preferred average particle sizes are less than 100 nm, less than 80 nm, less than 50 nm, less than 30 nm, less than 20 nm, although still larger, or smaller, nanoparticles can also be used. Most preferably, the upconverting nanoparticles have an average particle size creates no appreciable light scattering.

Examples of materials for use as sensitizers and annihilators are described in International Application No. PCT/US2019/063629, of Congreve, et al., filed Nov. 27, 2019, S. Sanders, et al., "Photon Upconversion in Aqueous Nanodroplets", J. Amer. Chem. Soc. 2019, 141, 9180-9184, and Beauti, Sumar, Abstract entitled "Search for New Chromophore Pairs for Triplet-Triplet Annihilation Upconversion" ISEF Projects Database, Finalist Abstract (2017), available at https://abstracts.societyforscience.org, each of the foregoing being hereby incorporated herein by reference in its entirety. WO2019/025717 of Baldeck, et al., published Feb. 7, 2019, and International Application No. PCT/US2019/063629, of Congreve, et al., filed Nov. 27, 2019, also provide information that may be useful concerning the concentration of the upconverting nanoparticles and the concentrations of the sensitizer and annihilator in the photopolymerizable liquid.

An annihilator can comprise molecules capable of receiving a triplet exciton from a molecule of the sensitizer through triplet-triplet energy transfer, undergo triplet fusion with another annihilator molecule triplet to generate a higher energy singlet that emits light at a second wavelength to excite the photosensitizer to initiate polymerization of the photopolymerizable component. Examples of annihilators include, but are not limited to, polycyclic aromatic hydrocarbons, e.g., anthracene, anthracene derivatives (e.g., 9,10-bis(triisopropysilyl)ethynyl)anthracene, diphenyl anthracene (DPA) 9,10-dimethylanthracene (DMA), 9,10-dipolyanthracene (DTA), 2-chloro-9,10-diphtylanthracene (DTACI, 2-carbonitrile-9,10-dip tetrylanthracene (DTACN), 2-carbonitrile-9,10-dinaphthylanthracene (DNACN), 2-methyl-9,10-dinaphthylanthracene (DNAMe), 2-chloro-9,10-dinaphthylanthracene (DNACI), 9, 10bis (phenylethynyl) anthracene (BPEA), 2-chloro-9,10bis (phenylethynyl) anthracene (2CBPEA), 5,6,11,12-tetraphenylnaphthacene(rubrene), pyrene and or perylene (e.g., tetra-t-butyl perylene (TTBP). The above anthracene derivatives may also be functionalized with a halogen. Preferred halogenated anthracene derivative include, for example, DPA or 9,10-bis(triisopropysilyl)ethynyl)anthracene further functionalized with a halogen (e.g., fluorine, chlorine, bromine, iodine), more preferably at the 2 or at the 2 and 6 position. Bromine can be a preferred halogen. Fluorescent organic dyes can be preferred.

A sensitizer can comprise at least one molecule capable of passing energy from a singlet state to a triplet state when it absorbs the photonic energy of excitation at the first wavelength. Examples of sensitizers include, but are not limited to, metalloporphyrins (e.g., palladium tetraphenyl tetrabutyl porphyrin (PdTPTBP), platinum octaethyl porphyrin (PtOEP), octaethyl-porphyrin palladium (PdOEP), palladium-tetratolylporphyrin (PdTPP), palladium-meso-tetraphenyltetrabenzoporphyrin 1 (PdPh4TBP), 1,4,8,11,15,18, 22,25-octabutoxyphthalocyanine (PdPc (OBu)), 2,3-butanedione (or diacetyl), or a combination of several of the above molecules. Other examples of sensitizers include osmium sensitizers. See, for example, R. Haruki, et al, Chem. Commun., 2020, Advance Article accepted 13 May 2020 and published 13 May 2020, the abstract of which is available at https://doi.org/10.1039/D0CC02240C which paper is hereby incorporated herein by reference.

The sensitizer preferably absorbs the excitation at the first wavelength in order to make maximum use of the energy thereof.

A consideration in selecting a photosensitizer/annihilator pair may include the compatibility of the pair with the photoinitiator being used.

Preferably upconverting nanoparticles include a core portion that includes the sensitizer and the annihilator in a liquid (e.g., oleic acid) and an encapsulating coating or a shell (e.g., silica) around the outer surface of the core portion. Examples of preferred upconverting nanoparticles include nanocapsules described in International Application No. PCT/US2019/063629, of Congreve, et al., filed Nov. 27, 2019, which is hereby incorporated herein by reference in its entirety. Other information concerning nanocapsules that may be useful includes International Publication No. WO2015/059179, of Landfester, et al., which published Apr. 30, 2015, and S. Sanders, et al., "Photon Upconversion in Aqueous Nanodroplets", J. Amer. Chem. Soc. 2019, 141, 9180-9184, each of which is hereby incorporated herein by reference in its entirety.

Upconverting nanoparticles can further include ligands at the surface thereof for facilitating distribution of the nanoparticles in the photopolymerization component. Surfactants and other materials useful as ligands are commercially available. Examples of ligands include, but are not limited to, poly-ethylene glycols.

A photoinitiator can be readily selected by one of ordinary skill in the art, considering its suitability for the mechanism to be used to initiate polymerization as well as its suitability for and/or compatibility with the resin to be polymerized. Information concerning photoinitiators that may be useful can be found in WO2019/025717 of Baldeck, et al., published Feb. 7, 2019, and International Application No. Application No. PCT/US2019/063629, of Congreve, et al., filed Nov. 27, 2019, each of which is hereby incorporated herein by reference in its entirety.

The photopolymerizable liquid included in the methods described herein may have any suitable viscosity. For printing a three-dimensional object that is floating within the volume in the container or build chamber, a higher viscosity can be desirable for keeping the object that is being printed suspended. A photopolymerizable liquid having a viscosity of about 1,000 centipoise or higher, 2,000 centipoise or higher, 4,000 centipoise or higher, or even higher can be preferred in this regard.

The methods in accordance with the present invention are additionally useful for printing 3D objects from photopolymerizable liquids that demonstrate non-Newtonian behavior and which can be solidified at volumetric positions impinged upon by excitation light at a first wavelength by upconversion-induced photopolymerization. Preferably, the upconversion comprises triplet upconversion (or triplet-triplet annihilation, TTA) which may be used to produce light of a higher energy relative to light used to photoexcite the sensitizer or annihilator. Most preferably, the sensitizer absorbs low energy light and upconverts it by transferring energy to the annihilator, where two triplet excitons may combine to produce a higher energy singlet exciton that may emit high-frequency or shorter-wavelength light, e.g., via annihilation upconversion.

The excitation light for use with a photopolymerizable liquid including an upconverting component is preferably selected to include light at the first wavelength that excites the upconverting component to emit light at a second wavelength to activate the photoinitiator to initiate photopolymerization.

Most preferably the photopolymerizable liquid includes an upconverting component with a nonlinear, such as quadratic, threshold for generating upconverted light with respect to light input. Such non-linear thresholds are ideally $x^2$, $x^3$, $x^4$, or higher.

In the methods of the present invention, the volume of a photopolymerizable liquid is preferably included within a container wherein at least a portion of the container is optically transparent so that the photopolymerizable liquid is accessible by excitation light. Preferably, the entire container is optically transparent.

Optically transparent portions of a container can be constructed from a material comprising, for example, but not limited to, glass, quartz, fluoropolymers (e.g., Teflon FEP, Teflon AF, Teflon PFA), cyclic olefin copolymers, polymethyl methacrylate (PMMA), polynorbornene, sapphire, or transparent ceramic.

Examples of container shapes include, but are not limited to, a cylindrical container having a circular or oval cross-section, a container having straight sides with a polygonal cross-section or a rectangular or square cross-section.

Preferably the optically transparent portion(s) of the container is (are) also optically flat.

Optionally, one or more filters are added to at least a surface of any optically transparent portions of the container to block undesired light, e.g., with a wavelength the same as the upconverted light (e.g., light with the second wavelength), to prevent unintentional curing.

Preferably the photopolymerizable liquid is degassed, purged or sparged with an inert gas before or after being introduced into the container and is maintained under inert conditions, e.g., under an inert atmosphere, while in the container which is preferably closed during printing. This can prevent introduction of oxygen into the container while the three-dimensional object is being printed or formed. Preferably the container is sealed or otherwise closed in an air-tight manner to prevent introduction of oxygen into the container during printing. The seal or other closing techniques that may be used should not be permanent so at least that the printed objects and unpolymerized material can be removed from the container.

In certain instances, depending, for example, upon the materials used, the photopolymerizable liquid is preferably substantially oxygen free (e.g., less than 50 ppm oxygen) during printing.

In the methods described herein, the container may be rotated to provide additional angles of illumination or projection of excitation light into the volume of photopolymerizable liquid contained therein. This can be of assistance in patterning object volumes or surfaces more accurately or it can be used as a means of providing multiple exposure of a given feature from different angles.

In the method described herein, the container may be stationary while an optical projection of excitation light is being directed into the photopolymerizable liquid.

The photopolymerizable liquid may further include additional additives. Examples of such additives include, but are not limited to, thixotropes, oxygen scavengers, etc. WO2019/025717 of Baldeck, et al., published Feb. 7, 2019, provides information that may be useful regarding additives.

Other information that may be useful in connection with the present invention includes U.S. Patent Application No. 62/911,125 of Congreve, et al., filed Oct. 4, 2019, U.S. Patent Application No. 62/911,128 of Congreve, et al., filed Oct. 4, 2019, and U.S. Patent Application No. 63/003,051 of Kazlas, filed Mar. 31, 2020.

Other information concerning optical systems that may useful in connection with the various aspects of the present inventions includes Texas Instruments Application Report DLPA022-July 2010 entitled "DLP™ System Optics"; Texas Instruments "TI DL® Technology for 3D Printing—Design scalable high-speed stereolithography [sic] systems using TI DLP technology" 2016; Texas Instruments "DLP6500 0.65 1018p MVSP Type A DMD", DLP6500, DLPS040A-October 2014—Revised October 2016; and Y-H Lee, et al., "Fabrication of Periodic 3D Nanostructuration for Optical Surfaces by Holographic Two-Photon-Polymerization", Int'l Journal of Information and Electronics Engineering, Vol 6, No. 3, May 2016, each of the foregoing being hereby incorporated herein by reference in its entirety.

When used as a characteristics of a portion of a container or build chamber, "optically transparent" refers to having high optical transmission to the wavelength of light being used, and "optically flat" refers to being non-distorting (e.g., optical wavefronts entering the portion of the container or build chamber remain largely unaffected).

As used herein, the singular forms "a", "an" and "the" include plural unless the context clearly dictates otherwise. Thus, for example, reference to an emissive material includes reference to one or more of such materials.

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The invention claimed is:

1. A method for printing a three-dimensional object in a volume of a photopolymerizable liquid by photopolymerization, the method comprising:
   (a) providing a digital representation of a three-dimensional object that has been sliced into a plurality of sequential two-dimensional image slices along the z-direction;
   (b) processing each of the two-dimensional slices of the three-dimensional object into a sequence of subsampled images, each subsampled image comprising an arrangement of superpixels, wherein each superpixel has defined x and y dimensions and comprises a grouping of a number of adjacent pixels in which the number of pixels in each of the x and y dimensions is at least 2;
   (c) sequentially exposing each of the sequence of subsampled images of a slice at a selected location along the z-direction in the volume using excitation light until the volume at the selected location along the z-direction has been exposed to all of the subsampled images of the slice; and
   (d) sequentially repeating step (c) for a previously unexposed sequential slice of the three-dimensional object, each at different selected location along the z-direction, until the three-dimensional object is formed.

2. The method of claim 1 wherein power density of the excitation light is adjusted to account for absorption of the excitation light in the volume in the x,y-direction and/or the z-direction before projection of a first subsampled image of a subsequent slice is initiated.

3. The method of claim 1 wherein step (a) comprises providing a digital representation of the three-dimensional object, scaling the digital representation of the three-dimensional object in the x, y, and z dimensions to a selected size, and slicing the scaled digital representation of the three-dimensional object into a plurality of sequential two-dimensional image slices along the z-direction.

4. The method of claim 1 wherein a superpixel has an arbitrary shape.

5. The method of claim 1 wherein a superpixel has a selected geometric shape.

6. The method of claim 1 wherein less than 10% of the superpixels of a slice are active at once.

7. The method of claim 1 wherein all superpixels of a subsampled image are projected simultaneously.

8. The method of claim 1 wherein each of the superpixels of a subsampled image is separated from any other superpixel of the subsampled image by a distance.

9. The method of claim 1 wherein each of the superpixels of a subsampled image is separated from any other superpixel of the subsampled image by a distance that-is at least the width of a single pixel.

10. The method of claim 1 wherein exposing the sequence of subsampled images of the slice is repeated to further expose the photopolymerizable liquid for curing.

11. The method of claim 1 wherein a slice of the three-dimensional object is not fully cured during the initial sequence of projecting the subsampled images thereof.

12. The method of claim 1 further comprising repeating step (c) one or more times to fully cure the slice.

13. The method of claim 1 wherein the photopolymerizable liquid is cured by two-photon absorption.

14. The method of claim 1 wherein step (a) comprises providing a digital representation of the three-dimensional object, adjusting the digital representation of the three-dimensional object to scale the z dimension to account for index refraction in the photopolymerizable liquid, and slicing the adjusted digital representation of the three-dimensional object into a plurality of sequential two-dimensional image slices along the z-direction.

15. The method of claim 14 further comprising scaling the digital representation of the three-dimensional object in the x, y, and z dimensions to a selected size before adjusting the digital representation of the three-dimensional object to scale the z dimension to account for the index of refraction of the photopolymerizable liquid.

16. The method of claim 1 wherein the superpixels of a subsampled image are arranged in a grid.

17. The method of claim 16 wherein the grid of a subsampled image is the same as the grid of the previously formed slice.

18. The method of claim 16 wherein the grid of a subsampled image is shifted by a selected distance in relation to that of the previously printed subsampled image to create an offset between the two subsampled images.

19. The method of claim 16 wherein the grid of a subsampled image is different from the grid of the previously formed slice.

20. The method of claim 19 wherein the grid of the subsampled image is shifted by a selected distance in relation to that of the previously printed subsampled image to create an offset between the two subsampled images.

21. The method of claim 1 wherein a subsampled image of the sequence of subsampled images of a given slice is offset by one or more pixels from the previously exposed subsampled image.

22. The method of claim 21 wherein the offset is by one pixel from the previously exposed subsampled image.

23. A method for printing a three-dimensional object in a volume of a photopolymerizable liquid by photopolymerization, the method comprising:
   (a) providing a digital representation of a three-dimensional object that has been sliced into a plurality of sequential two-dimensional image slices along the z-direction;
   (b) processing each of the two-dimensional slices of the three-dimensional object into a sequence of subsampled images, each subsampled image comprising an arrangement of superpixels wherein each superpixel has defined x and y dimensions and comprises a grouping of a number of adjacent pixels in which the number of pixels in each of the x and y directions is the same and is at least 2;
   (c) sequentially exposing each of the sequence of subsampled images of a slice at a selected location along the z-direction in the volume using excitation light until the volume at the selected location along the z-direction has been exposed to all of the subsampled images of the slice; and
   (d) sequentially repeating step (c) for a previously unexposed sequential slice of the three-dimensional object, each at different selected location along the z-direction, until the three-dimensional object is formed.

24. The method of claim 23 wherein the photopolymerizable liquid is cured by two-photon absorption.

* * * * *